United States Patent
Joshis et al.

(10) Patent No.: US 12,498,786 B2
(45) Date of Patent: Dec. 16, 2025

(54) METHODS AND SYSTEMS FOR REAL-TIME SACCADE PREDICTION

(71) Applicant: VALORBEC SOCIETE EN COMMANDITE, Quebec City (CA)

(72) Inventors: Yashas Joshis, Montreal (CA); Charalambos Poullis, Beaconsfield (CA)

(*) Notice: Subject to any disclaimer, the term of this patent is extended or adjusted under 35 U.S.C. 154(b) by 0 days.

(21) Appl. No.: 18/420,355

(22) Filed: Jan. 23, 2024

(65) Prior Publication Data
US 2024/0248533 A1    Jul. 25, 2024

Related U.S. Application Data

(60) Provisional application No. 63/481,428, filed on Jan. 25, 2023.

(51) Int. Cl.
| | |
|---|---|
| *G06F 3/01* | (2006.01) |
| *G02B 27/00* | (2006.01) |
| *G02B 27/01* | (2006.01) |
| *G06T 19/00* | (2011.01) |
| *G09G 5/391* | (2006.01) |

(52) U.S. Cl.
CPC ......... *G06F 3/013* (2013.01); *G02B 27/0093* (2013.01); *G02B 27/0172* (2013.01); *G06F 3/012* (2013.01); *G06T 19/006* (2013.01); *G09G 5/391* (2013.01); *G09G 2340/0407* (2013.01)

(58) Field of Classification Search
CPC .......... G06F 3/013; G06F 3/011; G06F 3/012; G06F 2203/012; G02B 27/0172; G02B 27/0093; G06T 19/006; G06T 19/003; G06T 15/20
See application file for complete search history.

(56) References Cited

U.S. PATENT DOCUMENTS

| | | | | |
|---|---|---|---|---|
| 2018/0165881 | A1* | 6/2018 | Pohl | G06F 3/011 |
| 2019/0012824 | A1* | 1/2019 | Sun | G06F 3/011 |
| 2019/0324276 | A1* | 10/2019 | Edwin | G06V 20/20 |
| 2020/0409457 | A1* | 12/2020 | Terrano | G06F 3/013 |
| 2021/0173474 | A1* | 6/2021 | Sztuk | G06F 3/013 |
| 2021/0373657 | A1* | 12/2021 | Connor | G06T 5/90 |
| 2022/0070567 | A1* | 3/2022 | Skoglund | G06F 3/013 |
| 2022/0084301 | A1* | 3/2022 | Joshi | G06F 3/011 |

* cited by examiner

*Primary Examiner* — Xuemei Zheng
(74) *Attorney, Agent, or Firm* — Rosenberg, Klein & Lee

(57) ABSTRACT

Navigation of a virtual environment (VE) can mean navigating a VE that is spatially larger than the available Physical Tracked Space (PTS). Accordingly, the concept of redirected walking was introduced in order to provide a more natural way of navigating a VE, albeit with many restrictions on the shape and size of the physical and virtual spaces. However, prior art techniques have limitations such as requiring eye-tracking increasing costs and complexity of the user's head mounted display system or triggering major saccades in the user. Accordingly, the inventors have established a novel technique which overcomes these limitations. The technique is based on a machine learning/artificial intelligence system that predicts saccades such that the psychological phenomenon of inattentional blindness can be applied for re-directed walking without requiring the triggering major saccades in the users, complex expensive systems, etc.

8 Claims, 7 Drawing Sheets

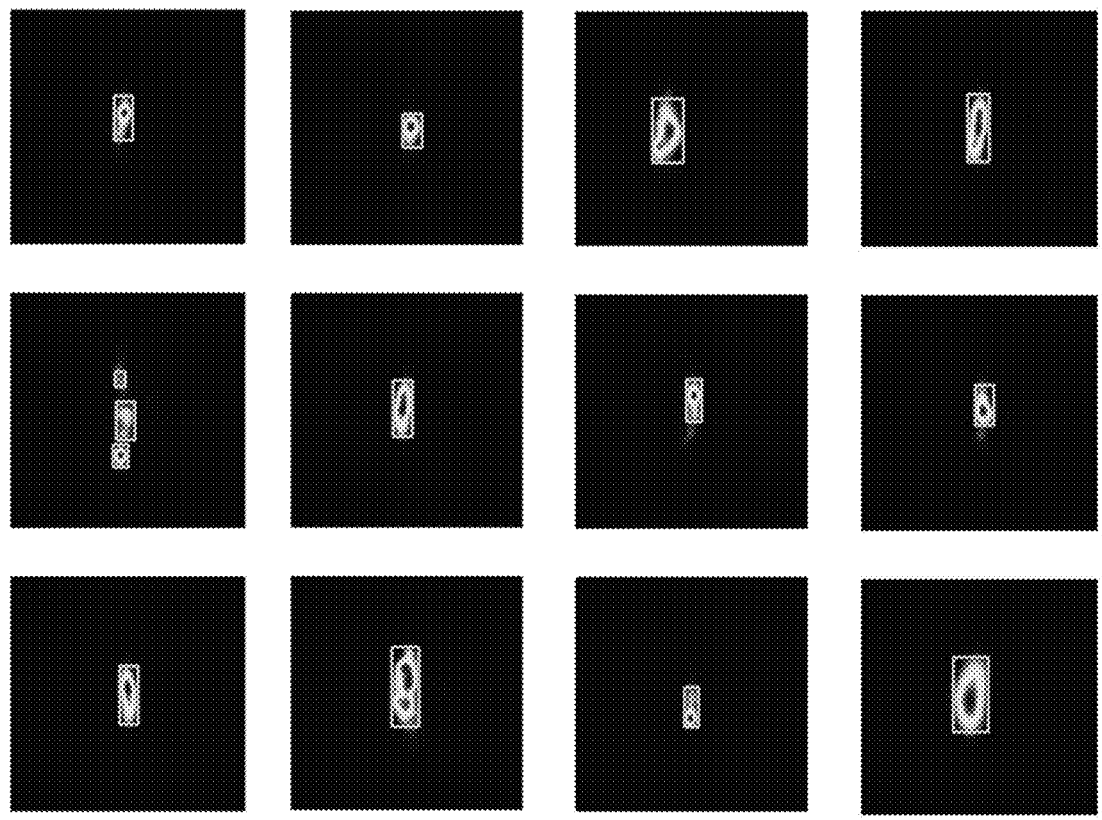
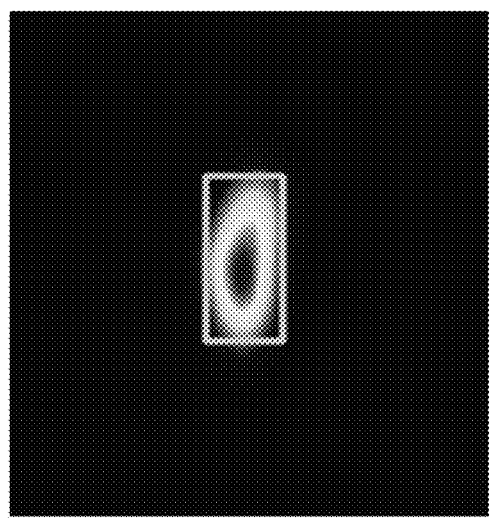
400A
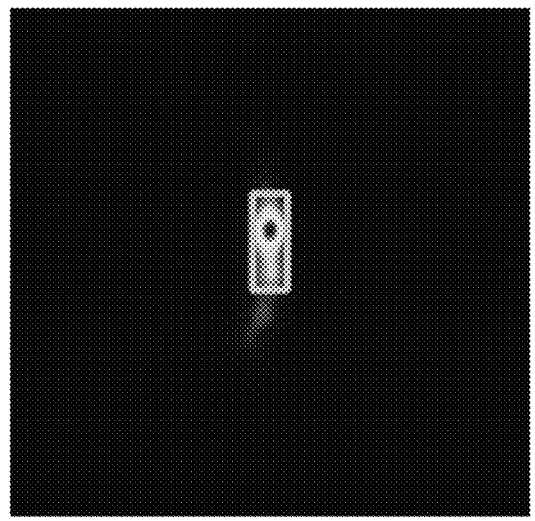
400B
Figure 4C

METHODS AND SYSTEMS FOR REAL-TIME SACCADE PREDICTION

This patent application claims the benefit of priority from U.S. Provisional Patent Application 63/481,428 filed Jan. 25, 2023; the entire contents of which are incorporated herein by reference.

FIELD OF THE INVENTION

This patent application relates to virtual reality and more particularly to methods and systems for real-time saccade prediction of a user and predicting real-time saccades for applying virtual environment rotations during saccades for redirected motion allowing a user to navigate a virtual environment spatially larger than the available physical space.

BACKGROUND OF THE INVENTION

Navigating virtual environments becomes a challenge when the dimensions of the virtual environment are larger than the available physical tracked space (PTS). Amongst the techniques for addressing this redirected walking (RW) is an effective technique for exploring large virtual environments (VE). Redirected walking is one embodiment of redirected motion. By warping the VE, the user is redirected away from the boundaries of the PTS. However, a significant challenge of RW techniques is ensuring that the manipulation or "interference" with the VE is imperceptible to the user as otherwise this leads to a reduced sense of presence.

Accordingly, it would be beneficial to provide a redirected walking technique that leverages the natural phenomenon of change blindness occurring during saccades. Inventive methods and systems exploiting a neural network trained on eye-tracking data are presented for predicting saccades. Beneficially, the inventive methods and systems, unlike state-of-the-art approaches to RW, can operate with consumer-level VR headsets and do not impose additional hardware requirements like eye-trackers or motion sensing systems.

Since the early days of virtual reality researchers have investigated ways of users navigating virtual environments (VEs) that are spatially larger than the available Physical Tracked Space (PTS). A number of locomotion techniques relying on pointing devices or walking in-place were proposed which have since become customary in VE applications. However, users find these methods cumbersome and unnatural. The concept of redirected walking was introduced about 20 years ago in order to provide a more natural way of navigating VEs, albeit with many restrictions on the shape and size of the physical and virtual spaces.

A number of approaches have since been proposed for implementing redirected walking based upon hardware or software techniques. Hardware-based techniques such as omni-directional treadmills, VirtuSphere for example, etc. are not only expensive solutions to this problem but also fail to provide inertial force feedback equivalent to natural walking. In contrast, software-based techniques are more cost effective and typically involve applying perceptually subtle rotations to the VE causing the user to unknowingly change their walking direction. Applying these rotations to the VE, however subtle, can negatively impact the sense of immersion of the user. This arises as these techniques either employ warping which introduces visual artifacts and distortions in the VE or even simulation sickness or rely on forcing the user to look away by stimulating major saccades in order to update the environment during the subsequent rapid eye movement resulting from the stimulated major saccades.

Accordingly, it would be beneficial to provide a method of redirected walking for users exploiting virtual reality (VR) or a VE allowing virtual distances and spaces to be traversed which are larger than the available physical space to the user. The inventors have therefore established a novel technique based on the psychological phenomenon of inattentional blindness without requiring the triggering major saccades in the users, complex expensive systems, etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to virtual reality and more particularly to methods and systems for real-time saccade prediction of a user and predicting real-time saccades for applying virtual environment rotations during saccades for redirected walking allowing a user to navigate a virtual environment spatially larger than the available physical space.

In accordance with an embodiment of the invention there is provided a method of redirecting motion of a user comprising:
  establishing a machine learning model;
  training the machine learning model; and
  employing the trained machine learning model to predict a predetermined natural event relating to an eye of the user.

In accordance with an embodiment of the invention there is provided a head mounted display (HMD) comprising:
  one or more display for rendering visual content to a user of the HMD; and
  a microprocessor executing computer executable instructions stored within a memory accessible to the microprocessor; wherein
  a portion of the computer executable instructions relate to a trained machine learning model which predicts a predetermined natural event relating to an eye of the user; and
  the output of the trained machine learning model is employed by the microprocessor to adjust the visual content rendered to the user of the HMD.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4C depicts average eye gaze positions on a virtual reality display for an average VR system user as employed within an embodiment of the invention;

FIG. 5 depicts heat mapped average eye gaze positions for each participant in a first user study as described within the specification;

DETAILED DESCRIPTION

Figure 1:
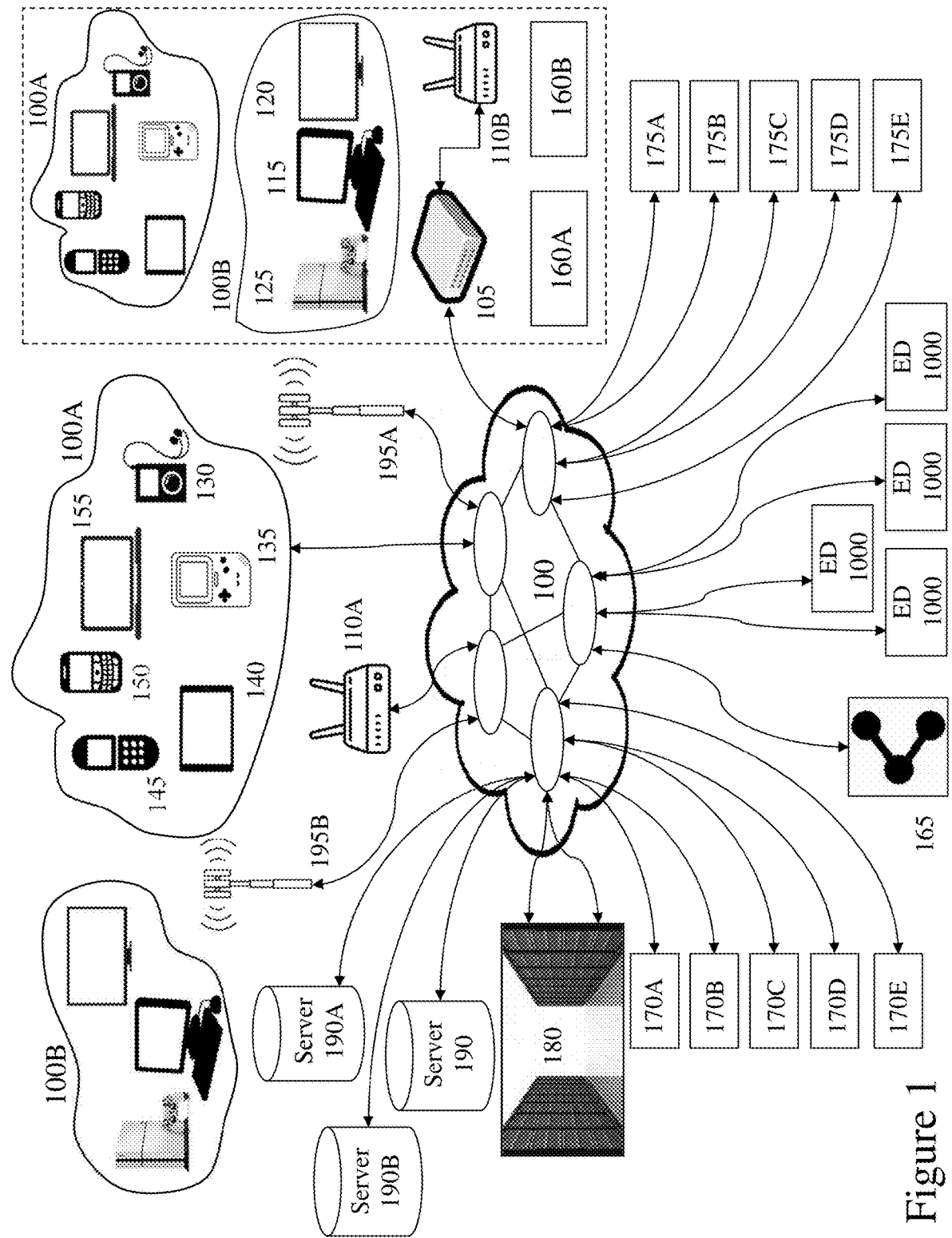
FIG. 1 depicts an exemplary network environment within which configurable electrical devices according to and supporting embodiments of the invention may be deployed and operate.

The present invention is directed to virtual reality and more particularly to methods and systems for real-time saccade prediction of a user and predicting real-time saccades for applying virtual environment rotations during saccades for redirected walking allowing a user to navigate a virtual environment spatially larger than the available physical space.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, motion sensors, and head mounted displays (HMDs).

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

A "major saccade" as used herein, and throughout disclosure, refers to a quick, simultaneous movement of both eyes between two or more phases of fixation in the same direction. A major saccade is a rapid, ballistic movement of the eyes that abruptly changes the point of fixation. A major saccade is typically defined by movement of the eyes with a velocity greater than 180°.

A "minor saccade" or "microsaccade" as used herein, and throughout disclosure, refers to a fixational eye movements which are small, jerk-like, involuntary eye movements, similar to miniature versions of major saccades but typically occurring during visual fixation. A minor saccade is typically defined by movement of the eyes with a velocity less than 180°/second.

A "Head Mounted Display" (HMD) as used herein, and throughout this disclosure, refers to is a display device, worn on the head or as part of a helmet which has a small display device in front of one (monocular HMD) of a user or each eye of the user (binocular HMD). HMDs differ in whether they can display only computer-generated imagery (CGI) in what are referred to commonly as virtual reality (VR) or a virtual environment (VE), only live imagery from the physical world, or a combination thereof in what is referred to as augmented reality (AR) or mixed reality (MR).

An "eye-tracker" as used herein, and throughout this disclosure, refers to a device which measures rotations of an eye. Eye-trackers principally exploit measurement of the movement of an object (e.g., a special contact lens) attached to the eye; optical tracking without direct contact to the eye; and measurement of electric potentials using electrodes placed around the eyes. Optical methods are widely used for gaze-tracking and are favored for being non-invasive and inexpensive where light, for example infrared light, is reflected from the eye and sensed by a camera or some other specially designed optical sensor. The information is then analyzed to extract eye rotation from changes in reflections.

An "artificial intelligence system" (referred to hereafter as artificial intelligence, AI) as used herein, and throughout disclosure, refers to machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited to, programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within their own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

"Redirected walking" as used herein refers to, but is not limited to, the redirection of a user's motion within a physical environment through the presentation of adjusted visual content which induces the redirection by the user. Whilst this specification and embodiments of the invention are described with respect to "walking" it would be evident that this is one specific form of redirected motion. As such embodiments of the invention may be applied to redirected walking, redirected jogging, redirected running, wheelchair redirection, mobility device redirection. Whilst, within this specification and embodiments of the invention are described with respect to redirections of a user's overall path, e.g., making their motion essentially circular within the PTS whilst they traverse a linear or other path within the VR, it would be evident that the redirection may be translational or a combination of translational and rotational.

1. Re-Directed Walking

Over recent years, there have been notable advancements in Virtual Reality (VR) devices due to the advent of graphical processor units (GPUs) and low-cost displays. As a result, many interaction-based VR applications surged to gain mainstream consumer and industrial attention. People can now explore virtual environments (VEs) from the comfort of their living rooms or offices. However, navigating virtual environments that are spatially larger than the available physical-tracked space (PTS) remains an open research problem. The most common locomotion techniques currently available rely on pointing devices or walking in place. These techniques are unnatural and can negatively impact the sense of presence and immersion since they fail to provide the required inertial force feedback necessary to furnish a sensation of moving into space.

Redirected walking (RDW), introduced in the early 2000s, offered a more natural approach for locomotion. In theory, users can navigate an infinite virtual space using redirected walking while remaining within the boundaries of the available physical-tracked space. Since its inception, researchers have proposed several hardware based and software-based techniques.

Hardware-based techniques, e.g., omnidirectional treadmills and VirtuSphere, require expensive specialized equipment that allows the user to walk in place. The main drawback of these techniques is that the inertial force feedback provided is not equivalent to natural walking therefore causing vection.

Software-based techniques, although cost-effective, augment the visual content presented to the user. A state-of-the-art technique following a software-based approach is that presented by Sun et al. in "Towards virtual reality infinite walking: dynamic saccadic redirection" (ACM Transactions on Graphics (TOG), Vol. 37(4):67, 2018). This technique leverages the natural phenomenon of change blindness induced due to rapid eye movements, also known as saccades, and eye blinks. Observable artifacts are introduced in the original content, such as light-flashes in two-dimensional (2D) VR or light-orbs in three-dimension (3D) for example, which serve as visual stimuli to trigger this change blindness. Highly efficient eye-trackers embedded in the VR headset continuously track the user's eyes in real-time. When a saccade or a blink is detected, the system applies subtle rotations to warp the entire VE while guiding the users away from potential collisions with physical objects, like furniture and walls, detected using a system capable of detecting the environment, e.g., Microsoft Kinect. Although being apparent, these rotations are imperceptible due to change blindness. However, the main drawback of this technique is that it changes how the user interacts with the virtual environment, deviating from the content creator's intention—for example, navigating around a landmark or playing a game while being distracted by artificially induced visual stimuli.

Following a similar approach, Joshi et al. in "Inattentional blindness for redirected walking using dynamic foveated rendering" (IEEE Access, 8:39013-39024, 2020) describes an eye-tracking device embedded into the VR headset and tracks the user's gaze in real-time while exploiting the psychological phenomenon of inattentional blindness. The system divides the user's virtual field-of-view (FoV) into zones using foveated rendering and continuously updates the peripheral zone, leading to subtle, imperceptible changes due to inattentional blindness. Furthermore, during the temporary blindness triggered due to natural suppressions such as saccades or blinks, the system updates the visual area in the foveal zone. Hence the entire frame buffer is updated in the direction determined by the RDW algorithm.

Since the eye-trackers required for saccadic redirection and foveated rendering are notably expensive for consumer use, a requirement to eliminate these hardware therefore results, Accordingly, the inventors within this specification outline inventive methods and systems that exploit neural networks (e.g., deep neural networks) for predicting saccades based upon the users' head rotation. The inventors present experimental data demonstrating a strong correlation between head rotation and eye direction under moderate cognitive load. Moreover, the inventors have established that users primarily use only six degrees of freedom (6DOF, namely head rotation and translation) and are predominantly fixating on a central area of the FoV.

The inventors have established an embodiment of the invention, referred to within this specification as SaccadeNet, which employs deep neural network trained using eye-tracking data collected during a user study for predicting saccades. Within embodiments of the invention, when a saccade is predicted, the VE is adjusted to reposition the user in the center of the room. The inventors also present results of a third user study that showed the VE updates were imperceptible to the users. The innovative methodology allowed allows users to walk, nearly linearly, significant distances in the VE whilst confined within a 3:5×3:5 m2 PTS, demonstrating the inventive method's effectiveness. The inventors established SaccadeNet with an average 94.75% accuracy during final user study experiments which was in real-time with negligible latency which are important aspects for deployment in many real world VR applications.

2. Exemplary Head-Mounted Display, Associated Electronic Devices, and Network Environment Supporting Embodiments of the Invention Referring to FIG. 1 there is depicted a Network 100 within which embodiments of the invention may be employed supporting Redirect Walking (RW) Systems, Applications and Platforms (RW-SAPs) according to embodiments of the invention. Such RW-SAPs, for example, supporting multiple communication channels, dynamic filtering, etc. As shown, first and second user groups 100A and 100B respectively interface to a telecommunications Network 100. Within the representative telecommunication architecture, a remote central exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B, respectively. Also connected to the Network 100 are first and second Wi-Fi nodes 110A and 110B, the latter of which being coupled to Network 100 via router 105. Second Wi-Fi node 110B is associated with commercial service provider 160 and comprises other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105. As will become evident in respect of FIGS. 2 and 3 PEDs and/or FEDs within first and second user groups 100A and 100B may provide the role of an electronic device, e.g., Electronic Device 204 or Electronic Device 310, to which a Head Mounted Display (HMD) may be interfaced in order to provide communications to/from Network 100 and therein other devices, systems, servers, etc.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 or Bluetooth as well in an ad-hoc manner.

Also connected to the Network 100 are Social Networks (SOCNETS) 165, first and second service providers 170A and 170B respectively, first and second third party service providers 170C and 170D respectively, and a user 170E who may receive data from one or more RW-SAPs and/or HMD(s). Also connected to the Network 100 are first and second enterprises 175A and 175B respectively, first and second organizations 175C and 175D respectively, and a government entity 175E who may receive data from one or more RW-SAPs and/or HMD(s). Also depicted are first and second servers 190A and 190B may host according to embodiments of the inventions multiple services associated with a provider of Redirect Walking (RW) Systems, Applications and Platforms (RW-SAPs); a provider of a SOCNET or Social Media (SOME) exploiting RW-SAP features; a provider of a SOCNET and/or SOME not exploiting RW-SAP features; a provider of services to PEDS and/or FEDS; a provider of one or more aspects of wired and/or wireless communications; an Enterprise 160 exploiting RW-SAP features; license databases; content databases; image databases; content libraries; customer databases; websites; and software applications for download to or access by FEDs and/or PEDs exploiting and/or hosting RW-SAP features. First and second primary content servers 190A and 190B may also host for example other Internet services such as a search engine, financial services, third party applications and other Internet based services.

Also depicted in FIG. 1 are Electronic Devices (EDs) 1000 according to embodiments of the invention such as described and depicted below in respect of FIGS. 3A and 3B which support RW-SAPs functionality and features as described and depicted in respect of FIGS. 4A to 12, respectively. As depicted in FIG. 1 an ED 1000 may communicate directly to the Network 100 through one or more wireless or wired interfaces included those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides RW-SAP features according to embodiments of the invention; execute an application already installed providing RW-SAP features; execute a web based application providing RW-SAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A. It would also be evident that a CONCUS may, via exploiting Network 100 communicate via telephone, fax, email, SMS, social media, etc.

Figure 2:
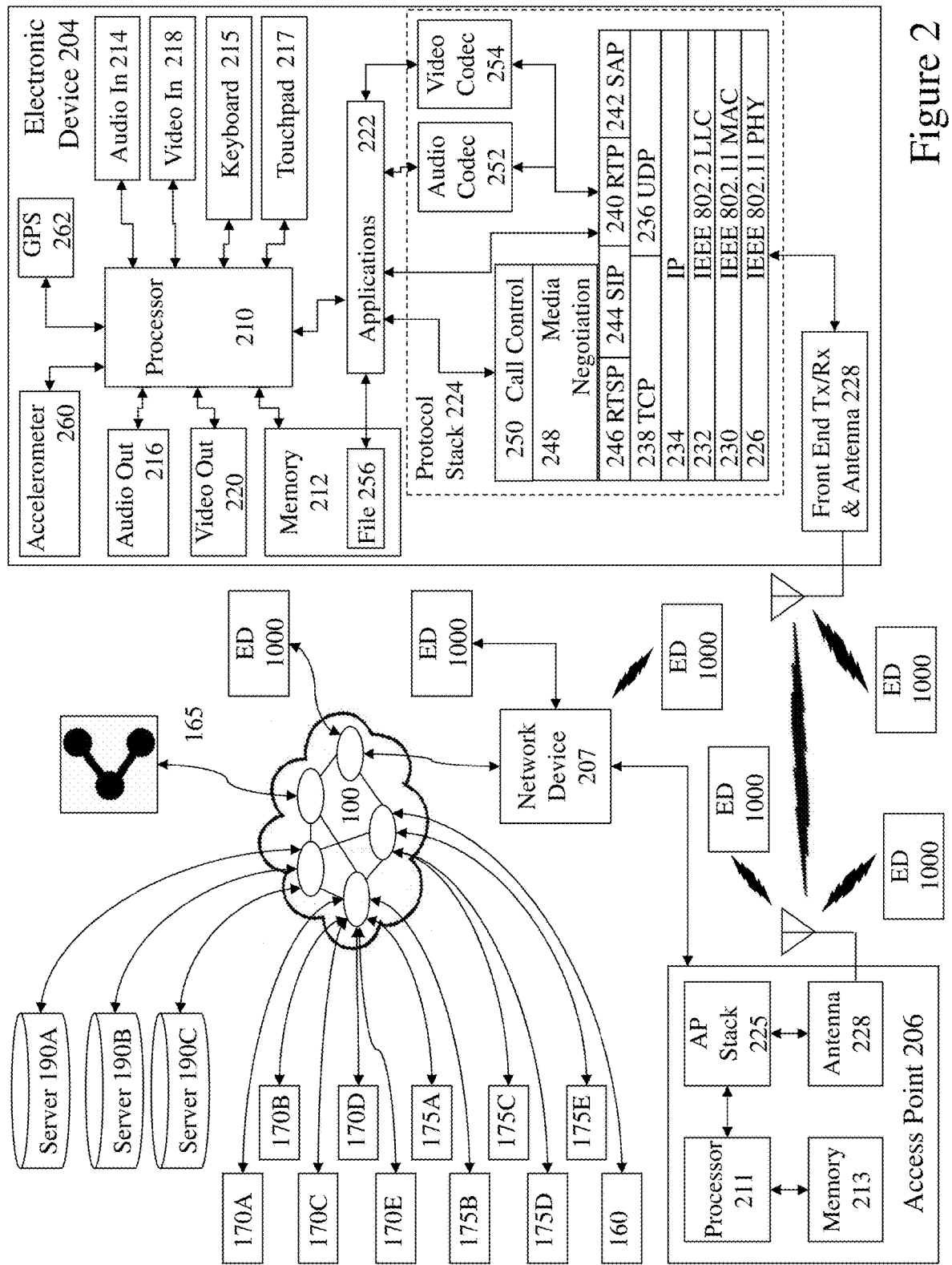
FIG. 2 depicts an exemplary wireless portable electronic device supporting communications to a network such as depicted in FIG. 1 and supporting embodiments of the invention.

Now referring to FIG. 2 there is depicted an Electronic Device 204 and network access point 207 supporting RW-SAP features according to embodiments of the invention. Electronic Device 204 may, for example, be a PED and/or FED and may include additional elements beyond those described and depicted. Also depicted within the Electronic Device 204 is the protocol architecture as part of a simplified functional diagram of a system that includes an Electronic Device 204, such as a smartphone 155, an Access Point 206, such as first AP 110, and one or more network devices 207, such as communication servers, streaming media servers, and routers for example such as first and second servers 190A and 190B respectively. Network Devices 207 may be coupled to Access Point 206 via any combination of networks, wired, wireless and/or optical communication links such as discussed above in respect of FIG. 1 as well as directly as indicated. Network devices 207 are coupled to Network 100 and therein Social Networks (SOCNETS) 165, first and second service providers 170A and 170B respectively, first and second third party service providers 170C and 170D respectively, a user 170E, first and second enterprises 175A and 175B respectively, first and second organizations 175C and 175D respectively, and a government entity 175E.

Electronic Device 204 includes one or more Processors 210 and a Memory 212 coupled to Processor(s) 210. Access Point 206 also includes one or more Processors 211 and a Memory 213 coupled to processor(s) 211. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of Processors 210 and 211 may be part of application specific integrated circuits (ASICs) or may be a part of application specific standard products (ASSPs). A non-exhaustive list of examples for Memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 204 may include an audio input element 214, for example a microphone, and an audio output element 216, for example, a speaker, coupled to any of Processors 210. Electronic Device 204 may include a video input element 218, for example, a video camera or camera, and a video output element 220, for example an LCD display, coupled to any of Processors 210. Electronic Device 204 also includes a Keyboard 215 and Touchpad 217 which may for example be a physical keyboard and touchpad allowing the user to enter content or select functions within one of more Applications 222. Alternatively, the Keyboard 215 and Touchpad 217 may be predetermined regions of a touch sensitive element forming part of the display within the Electronic Device 204. The one or more Applications 222 that are typically stored in Memory 212 and are executable by any combination of Processors 210. Electronic Device 204 also includes Accelerometer 260 providing three-dimensional motion input to the Processor 210 and GPS 262 which provides geographical location information to Processor 210.

Electronic Device 204 includes a Protocol Stack 224 and AP 206 includes an Access Point Stack 225. Protocol Stack 224 is shown as an IEEE 802.11 protocol stack but alternatively may exploit other protocol stacks such as an Internet Engineering Task Force (IETF) multimedia protocol stack for example. Likewise, AP Stack 225 exploits a protocol stack but is not expanded for clarity. Elements of Protocol Stack 224 and AP Stack 225 may be implemented in any combination of software, firmware and/or hardware. Protocol Stack 224 accordingly, when providing an IEEE 802.11 protocol stack includes an IEEE 802.11-compatible PHY module that is coupled to one or more Front-End Tx/Rx & Antenna 228, an IEEE 802.11-compatible MAC module coupled to an IEEE 802.2-compatible LLC module. Protocol Stack 224 includes a network layer IP module, a transport layer User Datagram Protocol (UDP) module and a transport layer Transmission Control Protocol (TCP) module.

Protocol Stack 224 also includes a session layer Real Time Transport Protocol (RTP) module, a Session Announcement Protocol (SAP) module, a Session Initiation Protocol (SIP) module and a Real Time Streaming Protocol (RTSP) module. As depicted Protocol Stack 224 also includes a presentation layer Call Control and Media Negotiation module 250, one or more Audio Codecs 252 and one or more Video Codecs 254. Applications 222 may be able to create maintain and/or terminate communication sessions with any of Network Devices 207 by way of AP 206. Typically, Applications 222 may activate any of the SAP, SIP, RTSP, media negotiation and call control modules for that purpose. Typically, information may propagate from the SAP, SIP, RTSP, media negotiation and call control modules to PHY module through TCP module, IP module, LLC module and MAC module.

It would be apparent to one skilled in the art that elements of the Electronic Device 204 may also be implemented within the Access Point 206 including but not limited to one or more elements of the Protocol Stack 224, including for example an IEEE 802.11-compatible PHY module, an IEEE 802.11-compatible MAC module, and an IEEE 802.2-compatible LLC module. The Access Point 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by Electronic Device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted in FIG. 2 are Electronic Devices (EDs) 100 according to embodiments of the invention such as described and depicted below in respect of FIGS. 3A and 3B. As depicted in FIG. 2 an ED 1000 may communicate directly to the Network 100. Other EDs 1000 may communicate to the Network Device 207, Access Point 206, and Electronic Device 204. Some EDs 1000 may communicate to other EDs 1000 directly. Within FIG. 2 the EDs 1000 coupled to the Network 100 and Network Device 207 communicate via wired interfaces but these may alternatively be wireless interfaces. The EDs 1000 coupled to the Access Point 206 and Electronic Device 204 communicate via wireless interfaces and/or wired interfaces. Each ED 1000 may communicate to another electronic device, e.g., Access Point 206, Electronic Device 204 and Network Device 207, or a network, e.g., Network 100. Each ED 1000 may support one or more wireless or wired interfaces including those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, FIG. 2 depicts an Electronic Device 204, e.g. a PED, wherein one or more parties including, but not limited to, a user, users, an enterprise, enterprises, third party provider, third party providers, wares provider, wares providers, financial registry, financial registries, financial provider, and financial providers may engage in one or more activities and/or transactions relating to an activity including, but not limited to, e-business, P2P, C2B, B2B, C2C, B2G, C2G, P2D, D2D, gaming, regulatory compliance, architectural design, emergency services, etc. via the Network 100 using the Electronic Device 204 or within either the Access Point 206 or Network Device 207 wherein details of the transaction are then coupled to the Network 100 and stored within remote servers. Optionally, rather than wired and/or wireless communication interfaces devices may exploit other communication interfaces such as optical communication interfaces and/or satellite communications interfaces. Optical communications interfaces may support Ethernet, Gigabit Ethernet, SONET, Synchronous Digital Hierarchy (SDH) etc.

Figure 3B:
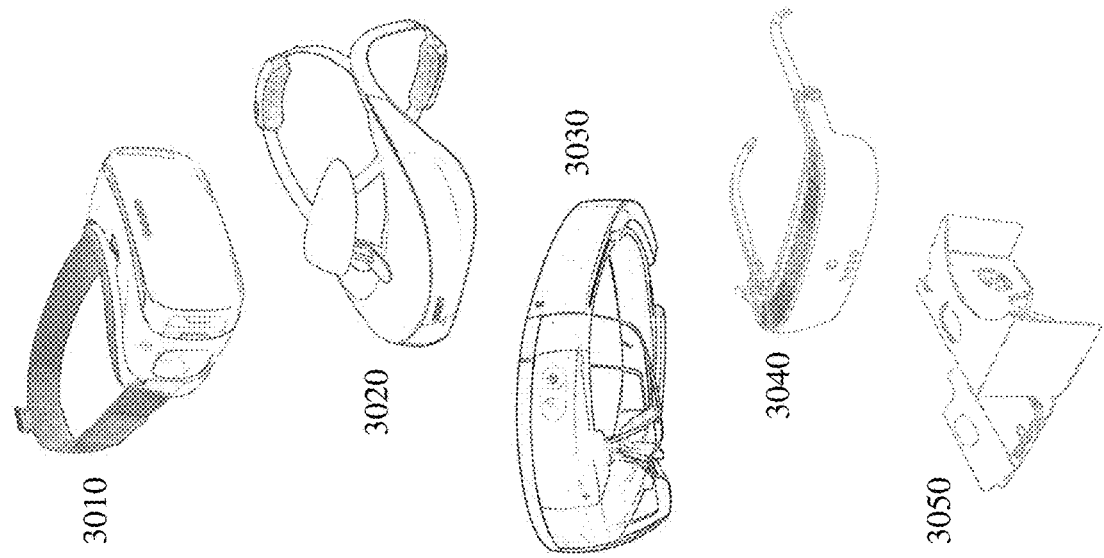
FIG. 3B depicts exemplary commercial HMDs supporting embodiments of the invention.
Figure 3A:
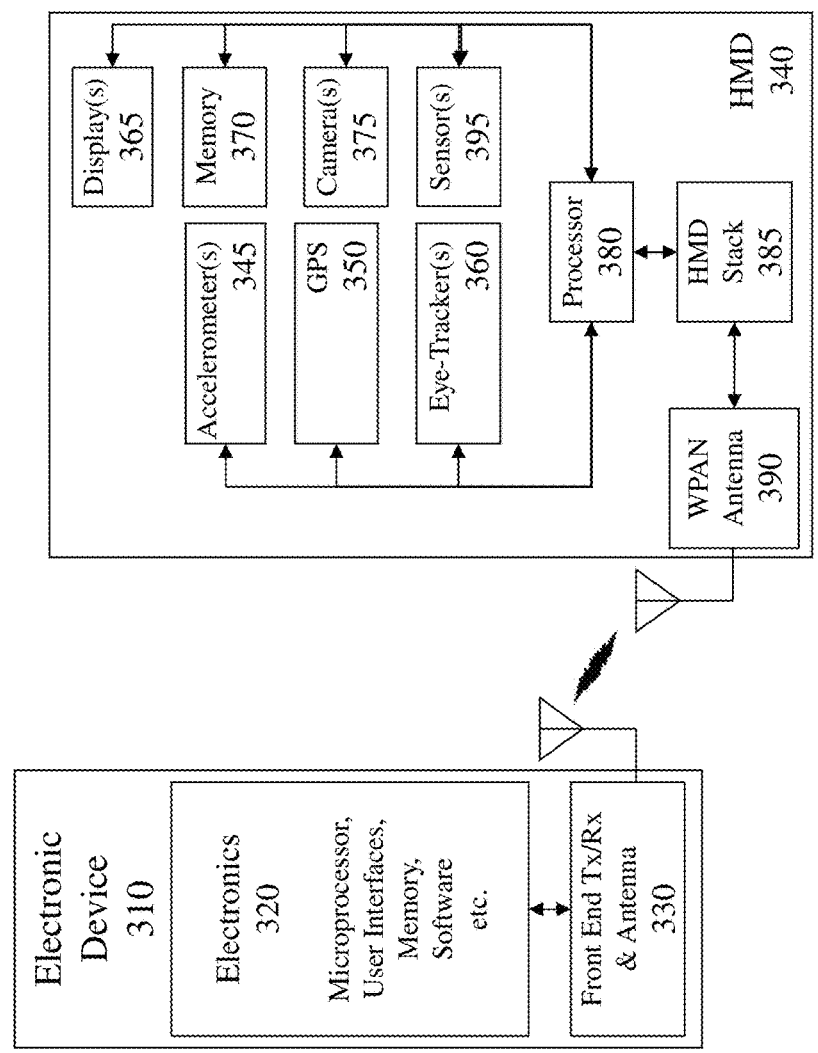
FIG. 3A depicts an exemplary head mounted display (HMD) supporting communications to a network such as depicted in FIG. 1, an electronic device such as described in FIG. 2, and supporting embodiments of the invention.

Within embodiments of the invention the Electronic Device 204 may itself be an HMD or as described and depicted in respect of FIG. 3A an Electronic Device 310, such as Electronic Device 204, for example may interface to an HMD 340. Accordingly, as depicted in FIG. 3A the HMD 340 is coupled to an Electronic Device 310 through a Wireless Personal Area Network (WPAN) interface between Front End Tx/Rx & Antenna (Antenna) 330 and WPAN Tx/Rx & Antenna 390. Antenna 330 is connected to Electronics 320 which comprises the microprocessor, user interfaces, memory, software etc. as described with respect to Electronic Device 204 in FIG. 2.

Within HMD 340 the WPAN Antenna 390 is connected to HMD Stack 385 and therein to Processor 380. As depicted the Processor 340 is coupled to elements of the HMD 340 which include, but are not limited to, Accelerometer(s) 345, GPS Receiver 350, Eye-Tracker(s) 360, Display(s) 365, Memory 370, Camera(s) 375 and Sensor(s) 395. Within other embodiments of the invention the HMD 340 may be designed solely for immersive applications and not include a Camera(s) 375. Similarly, the HMD 340 may not include a GPS Receiver 350 to provide location data in conjunction with motion tracking provided by the Accelerometer(s) 345. Optionally, the HMD 340 may not include Sensor(s) 395. However, within embodiments of the invention the Sensor(s) 395 may include orientation sensors, such as tilt sensors for example, and distance measurement sensors. For example, a distance measurement sensor may include, but not be limited to, a Light Detection and Ranging sensor (lidar), sound navigation ranging (sonar), a structured light source or structured light 3D scanner, such that the HMD 340 can determine a distance or distances to objects within the environment of a user of the HMD 340 which supports embodiments of the invention. Accordingly, within the embodiments of the invention described and depicted in respect of FIGS. 4A to 12 for the redirection of a user's motion an HMD 340 may establish an initial measurements of environment the user of the HMD 340 is within together with the user's location within that environment and employ this data to define aspects of the redirection process according to embodiments of the invention. Further, the redirection process according to embodiments of the invention may receive continuous and/or periodic environment updates to provide additional data for the redirection process according to embodiments of the invention or initiate a reset.

Further, whilst the redirection process according to embodiments of the invention is described and depicted in FIGS. 4A to 7 with respect to a user within a defined space devoid of obstacles it would be evident that the exploitation of such Sensor(s) 395 to provide environment information can also be employed within the redirection process according to embodiments of the invention to allow the user's motion to be redirected such that they avoid real world physical objects whilst interacting with the virtual environment being presented to them. For example, a user employing an HMD 340 with visual defects or degradations may be presented with a virtual environment wherein the redirection process according to embodiments of the invention employed allow the user to navigate their environment where their motion would otherwise lead them to hit an element of their environment, e.g., wall, door, chair, etc. Accordingly, whilst the redirection process according to embodiments of the invention are described and depicted with respect to a user achieving a large virtual travel distance within a space smaller than the distance travelled the redirection process according to embodiments of the invention may also be employed where the user's space is not as restricted or limited.

Optionally, within other embodiments of the invention the Sensor(s) 395 may be associated with other electronic devices worn and/or carried by the user for example wherein the data from these Sensor(s) 395 is communicated to the HMD 340 where the redirection process according to embodiments of the invention are performed by the Processor 380 within the HMD 340. Accordingly, the Sensor(s) 395 may be associated with wearable devices as well as PEDs and/or FEDs. Alternatively, where the redirection process according to embodiments of the invention are performed by another electronic device, e.g., Electronic Device 310 in FIG. 3A, then the data from the Sensor(s) 395 within the HMD 340 or other electronic devices worn and/or carried by the user would be communicated to the processor within the Electronic Device 310. Alternatively, processing may be provided by a remote service upon a remote server wherein the data from the Sensor(s) 395 within the HMD 340 or other electronic devices worn and/or carried by the user would be communicated to the remote server or service.

Optionally, the HMD 340 may include one or more haptic interfaces which provide information to the user by means other than through the Display(s) 365. For example, the HMD 340 may include a vibratory motor, a loudspeaker, a buzzer etc. which is triggered by a redirection process according to an embodiment of the invention, such as for example when a reset is to be performed, when the redirection process is exceeding a predetermined limit to seek redirection without a reset, etc. Optionally, the one or more haptic interfaces may be within one or more other electronic devices worn and/or carried by the user and receive data from one or more of the HMD 340, Electronic Device 310, or remote server etc. Accordingly, the haptic interface(s) may be associated with wearable devices.

Accordingly, HMD 340 may, for example, utilize the processor within Electronic Device 310, e.g. Processor 210 within Electronic Device 204 in FIG. 2, processing functionality such that a lower power Processor 380 may be employed within HMD 340 controlling, for example, acquisition of image data from Camera(s) 375, Sensor(s) 395, Eye-Tracker(s) 360, Accelerometer(s) 345 2076 and presentation of image data to the user via Display(s) 365 with information including one or more of instruction sets, algorithm(s), user profile(s), user biometric data etc. being stored within a memory of the HMD 340, not depicted for clarity or an electronic device, such as Electronic Device 310, which is exchanging data/information with HMD 340, e.g. the Electronic Device 310 and HMD 340 may be paired as known in wireless interfacing.

As noted above an HMD 340 may be employed to simply present visual content to the user, e.g. within an immersive virtual reality environment, or it may be employed to provide visual content to the user which has been processed to address and/or compensate for visual defects and/or vision degradations etc. either in an immersive virtual reality environment, an immersive real world environment, or an augmented reality environment. Accordingly, the HMD 340 and/or an electronic device associated with the user, e.g., Electronic Device 310, may store data relating to a particular individual's visual defects within a memory, such as Memory 212 of Electronic Device 204 in FIG. 2A or Memory 370 of HMD 340. This information may be remotely transferred to the Electronic Device 204 and/or HMD 340 from a remote system via Network Device 207 and Access Point 206, for example. Whilst FIG. 3A depicts a wireless interface between Electronic Device 310 and HMD 340 it would be evident that within other embodiments of the invention a wired connection may be employed discretely or in combination with a wireless interface. For example, an eSight Generation 3 HMD, as depicted in fourth image 3040, supports a wired USB connection to a PED/FED as well as a Bluetooth connection. Within HMD 340 the Processor 380 may execute embodiments of the invention discretely, in combination with the processor of Electronic Device 310, or through communications directly from HMD 340 or via Electronic Device 310 to one or more remote devices and/or services (e.g., a cloud based service). Similarly, the processing of image data acquired from the Camera(s) 375 may be solely within the HMD 340, be solely within the PED 310, be distributed between them, capable of being executed independently upon both, or be dynamically allocated according to constraints such as processor loading, battery status etc.

Accordingly, the image acquired from a Camera 375 associated with the HMD 340 may be processed by the HMD 340 directly but image data to be displayed may also be acquired from an external source directly or acquired and processed by the Electronic Device 310 for combination with that provided by the HMD 340 itself, in replacement of a predetermined portion of the image acquired by the HMD 340 or as the image(s) to be displayed to the user of the HMD 340. Whilst, within the following description with respect to FIGS. 4A to 12 the HMD 340 is employed in an immersive mode, e.g., no external environment is presented to the user, such as a game, virtual reality environment etc. However, it would be evident that the embodiments of the invention may also be employed within non-immersive modes of an HMD 340 such as those that provide augmented reality or assistance to a user.

Within embodiments of the invention the HMD 340 and any user interface it provides directly or upon a PED, such as Electronic Device 310, may be context aware such that the user is provided with different interfaces, software options, and configurations for example based upon factors including but not limited to cellular tower accessed, Wi-Fi/WiMAX transceiver connection, GPS location, local associated devices, dimensions of measured environment etc. Accordingly, the HMD 340 may be reconfigured upon the determined context of the user based upon the PED determined context. Optionally, the HMD 340 may determine the context itself based upon any of the preceding techniques where such features are part of the HMD 340 configuration as well as, for example, based upon processing the received image from the Camera(s) 375 and/or content being rendered upon the Display(s) 365. For example, the HMD 340 configuration and processing according to embodiments of the invention may change according to whether the user is walking, running, crawling, riding a bicycle, driving a vehicle, etc.

Referring to FIG. 3B there are depicted exemplary first to fifth HMDs 3010 to 3050 of HMDs which can exploit a redirection process according to an embodiment of the invention. Accordingly, these are:

First HMD 3010 Samsung Gear VR HMD;
Second HMD 3020 Sony HMZ-T3 W HMD;
Third HMD 3030 Microsoft™ Hololens HMD;
Fourth HMD 3040, eSight Generation 3 providing immersive and non-immersive environments through a bioptic tilt of the displays relative to the frame; and
Fifth HMD 3050, Google Cardboard which supports insertion of a smartphone for example and in conjunction with software splits the display of the smartphone into two regions each presented to only one eye of the user.

3. Background

Over the past few decades, virtual reality has gained mainstream consumer attention. Accordingly, various hardware and software-based techniques have emerged to unravel the conundrum of physical space size limitations for navigation in virtual reality. Within this section, the inventors present a brief overview of the research in this area which is, in their view, relevant to their inventive methods and systems. This review is categorized in terms of (i) redirected walking, (ii) hardware and software-based solutions, and (iii) natural visual suppressions and the most relevant state-of-the-art techniques that can redirect the user within the physical tracked space.

3.1 Redirected Walking

Among many interactions for VR, locomotion remains one of the most significant unsolved impediments to achieving an ideally immersive VR experience. Commonplace techniques like teleportation and flying serve their purpose while relying heavily on external hardware like controllers and gamepads. More often than not, they induce simulator sickness and break the presence due to their synthetic feel and unfamiliarity because of the lack of a natural equivalent. On the other hand, an increased sense of presence and reduced simulator sickness, make natural walking the most favoured form of locomotion by the majority of developers and users. Furthermore, since it is the most natural form of navigation for humans, it also increases the spatial understanding of VEs due to its intuitive nature.

However, despite its advantages, locomotion by natural walking poses one of the most significant challenges in VR as generally a limited availability of the PTS constrains users to within a finite physical boundary, while the virtual spaces involving large-scale VEs can theoretically be boundless. In order to address this a solely software-based technique, redirected walking, was introduced circa 2000.

Redirected walking allows users to cover long distances in largescale VEs by walking within a smaller PTS. Previous research has shown that the visual sense often dominates upon contradicting vestibular or proprioceptive senses. Redirected walking leverages this effect and manipulates the users' virtual FoV such that their real-world physical motion and virtual self-motion differ. For example, by asking users to walk along a predefined curved virtual path, researchers could inject subtle rotational gains that trick users into taking curved physical paths with a shorter radius. Furthermore, since these curved physical paths were mapped within the available PTS, it only allowed users to change their walking directions at the intersections of the predefined curved virtual paths while avoiding any possibility of crossing over the PTS boundaries. These minor discrepancies in the curvatures of physical and virtual paths sufficiently convinced users that they had explored a comparatively larger VE than the available PTS.

Since the inception of redirected walking, several algorithms have been proposed to estimate the amount of rotation applied to the virtual FoV at any given time during the immersive experience. This amount is estimated using two main parameters, namely, the target directions in the VE and the PTS. Furthermore, since the technique presumes a continuous movement from the users, the redirection must also be computed constantly in real-time. Among many methods of predicting the target direction in the VE, some exploit approaches based upon the users' past walking direction, whilst others employ the user's head rotations, and others gaze direction. However, to determine the target direction in the PTS, algorithms like steer-to-center, steer-to-orbit, and steer-to-multiple-targets were proposed by Razzaque, see "Redirected walking" (Citescer, 2005). As these names suggest, steer-to-center algorithms guide users away from any potential collision and towards the center of the PTS; steer-to-orbit guides them towards a fixed orbit around the center of the PTS; and steer-to-multiple-targets guides them towards one of the closest predefined waypoints in the PTS. Experiments performed within the prior art showed that in vast open virtual spaces, the steer-to-center algorithm performed significantly better than steer-to-multiple-targets. At the same time, steer-to-orbit performed best when virtual objects in the VE limited the walking directions for the users during the immersive experience.

Within the embodiments of the invention described below the inventors, by virtue of working with a VR allowing users to explore large-scale open virtual spaces, employed the steer-to-center algorithm. However, the embodiments of the invention may be applied with other steering algorithms without departing from the scope of the invention.

3.2 Hardware and Software-Based Solutions

The initial work of Razzaque established a route towards solving the enigma of navigation in virtual reality using simple software manipulations. Subsequently, within the prior art there have been reported developments to enhance the technique either by making the technique more efficient using clever software manipulations or taking a completely different hardware-based approach. Some methods were heavily dependent on additional factors different from the users' actions, such as consolidating external physical props or manipulating the entire PTS. However, whilst these techniques were plausible solutions, they failed to gain mainstream use due to their many external dependencies.

3.2.1 Hardware-Based Approaches

Sliding across a frictionless surface and walking while suspended freely in the air are examples of hardware-based approaches that focus on stationary equipment to solve the problem of navigation in VR. On the other hand, techniques like omnidirectional treadmills and walking in a giant "Hamster Balls" are focused mainly on moving equipment to provide a comparatively realistic immersive experience.

An omnidirectional treadmill is technically a treadmill made of many other tiny treadmills that move in opposite directions but work in tandem to impart a seamless sense of VR motion in any direction horizontally. It is primarily an exciting challenge as it tries to backpropagate the user's motion in the physical world to predetermine where they are headed in the virtual world. In 2010, an omnidirectional treadmill design was proposed by Souman et al. for example, see "Making virtual walking real: Perceptual evaluation of a new treadmill control algorithm" (ACM Transactions on Applied Perception, 7(2): 11, 2010) that employed a semi-autonomous position-based sensor to estimate the user's velocity while rotating the treadmill accordingly. Unfortunately, although this system works when the user is in continuous motion, it fails to calibrate when the user suddenly stops. Since there is a sudden change in users' velocity, the treadmill has to accommodate that. Moving the users back too fast may lead to overshooting the motion, which needs to be corrected, thus causing to rock the users back and forth. Many other researchers have also tried designing other omnidirectional treadmills.

Fernandes et al., see "The fully immersive spherical projection system" (Comm. of the ACM, 46(9):141-146, 2003), proposed a giant hamster-ball-like design following a similar non-stationary hardware-based approach. Unlike the omnidirectional treadmill, the giant hardware structure in this design is moved freely by the forces imparted by the user or users; however, due to the inertia of the heavy hardware, a similar problem arises.

Although all the techniques mentioned earlier are plausible solutions to navigation in VR, natural walking is still considered the most preferred way of exploring VR spaces as all of these techniques fail to provide the inertial force-feedback necessary to furnish the sensation of self-motion. Furthermore, the multimodal nature of walking also allows for even more realistic natural actions such as freely jumping or crouching.

3.2.2 Software-Based Approaches

Within the prior art there is also significant research on software-based techniques that solely rely on applying digital manipulations to the virtual FoV for redirection. Based on the scenario, techniques like those of Razzaque et al. in "Redirected walking" (Proceedings of Eurographics, 9:105-106, 2001) and Azamandin et al. in "An evaluation of strategies for two-user redirected walking in shared physical spaces" (IEEE Virtual Reality, pp. 91-98, 2017) redirect the users within the PTS by using their head rotations and translations to update the VE accordingly in real-time using rotational gains. While theoretically, the rotational gain can be applied on all of its components (pitch, yaw, roll), these techniques typically leverage humans' inability to perceive scaled manipulations in the yaw of the VEs. By applying subtle rotations to the yaw of the entire VE, one can change the users' target direction in the physical space while maintaining the same target direction in the virtual space. These subtle rotations force users to take a curved path in the physical space while maintaining a straight path in the virtual space. Disagreements between the vestibular and visual senses due to these subtle but varied physical and virtual motions are then subconsciously corrected by motor commands for recalibration from the users' brains.

Alternatively, techniques presented by Sun et al. in "Mapping virtual and physical reality" (ACM Transactions on Graphics, 35(4):64, 2016) and Dong et al. "Smooth assembled mappings for large-scale real walking" (ACM Transactions on Graphics, 36(6):211, 2017), rely on manipulating the structural properties of the VE itself. For example, by partially or fully wrapping the VE and objects in it. Some techniques within the prior art exploit manipulating the locations of the entire hallways, rooms, and doors. Such techniques managed to successfully convince users that they had explored a much larger VE than the available PTS by producing self-overlapping virtual spaces.

Other recently explored techniques include redirecting users with a single swift motion of the entire virtual space during visual suppressions, either natural or stimulated. These visual suppressions mainly include blinks and saccades. During the temporary change blindness due to these visual suppressions, the entire VE is rotated in one swift motion to redirect the users. Since these rotations are applied right in front of the users' eyes, researchers focus mainly on reducing the visual distractions resulting from repeated redirection. Langbehn et al. in "In the blink of an eye—leveraging blink-induced suppression for imperceptible position and orientation redirection in virtual reality" (ACM Transactions on Graphics, 37:1-11, 2018), Sun et al. in "Towards virtual reality infinite walking: dynamic saccadic redirection" (ACM Transactions on Graphics, 37(4):67, 2018) and Joshi et al. in "Inattentional blindness for redirected walking using dynamic foveated rendering" (IEEE Access, 8:39013-39024, 2020) are examples of redirection using change blindness during visual suppressions.

Furthermore, contrary to the techniques that seek to hide the subtle rotations from the users, many researchers also explored overt techniques that manipulated the VE such that it was undoubtedly detectable by the users. Although subtle techniques are imperceptible and thus preferable for most applications, sometimes overt techniques are also preferred due to safety or practical limitations. Techniques like freeze-back-up, freeze-turn, and 2:1 turn are some standard approaches proposed by Williams et al. in "Exploring large virtual environments with an HMD when physical space is limited" (ACM, pp. 41-48, 2007) for example. As the name suggests, freeze-back-up allows users to step back upon hitting the PTS boundary with a frozen FoV making enough room to continue walking. Similarly, freeze-turn allows users to turn by 180° with a frozen FoV, again making enough space to continue walking. Finally, a 2:1 turn allows users to make half a turn (180°) in any direction while concurrently making a complete turn (360°) of the FoV in the opposite direction. Hence, the user is again facing the same direction as before in the virtual space. Of these three approaches, the 2:1 turn is especially preferred as it reduces the simulator sickness caused due to the contradictions between visual and vestibular systems.

Moreover, although these kinds of redirections are rare, they are being used in hybrid techniques as a reset mechanism when subtle redirection techniques fail, i.e., when the users reach the bounds of the PTS. A reset mechanism is mainly employed as a last resort for the safety of the users and equipment.

3.3 Natural Visual Suppression

Due to several involuntary actions, humans face temporary blindness from time to time where these actions are known as visual suppressions. Two of the most frequent visual suppressions are blinks and saccades. Blinks are the rapid closing and opening of the eyelids, while saccades are the ballistic eye movements while changing the focus from one object to another in the natural FoV. Unfortunately, the reason behind these involuntary human behaviours is itself a conundrum to unravel.

Saccades are unpredictable ballistic eye movements triggered while changing focus from one object to another in the FoV. With speeds reaching up to 900°/s, the temporary blindness caused before, during, and after these rapid eye movements can last for around 20 to 200 ms. These are very frequently occurring visual suppressions that require high-end eye trackers for detection in real-time. On the contrary, blinks are scarce and more gradual in comparison. The temporary blindness induced due to a blink can typically last for about 100 to 400 ms. Previous studies have shown that due to the above-mentioned temporary blindness, users fail to notice subtle changes introduced in the scene during any visual suppression. This phenomenon is commonly known as change blindness. Due to the lack of attention, minor details can be altered during visual suppression without noticing. According to the previous research, since the visual sense dominates over all the other senses, rotating the entire VE during a blink or a saccade can manipulate users into taking curved paths in the physical space while maintaining a straight path in the virtual space.

One such technique, Langbehn et al., leverages the phenomenon of change blindness during naturally occurring blinks to rotate the entire VE. Concurrently, Sun et al. leverages the change blindness caused due to the other visual suppression, i.e., saccades. Although this technique fulfilled the requirement of redirection, it relied on simulating artificial saccades by flashing orbs both in the screen and object space, distracting the users from the task at hand.

Following these approaches, Joshi et al. proposed a technique that combines the effects of change blindness with inattentional blindness. The FoV was divided into three zones: peripheral, foveal, and transitional, and rendered using dynamic foveated rendering. Based on their importance, the zones are updated one at a time, slowly replacing the entire frame buffer without noticing. Finally, they update the foveal zone using the temporary blindness caused due to naturally occurring saccades.

However, it would be evident that leveraging the effects of change blindness with inattentional blindness for RW places demands upon the VR system as a saccade must be detected and the rotation(s) of one or more portions of the FoV applied during the duration of the saccade. Accordingly, it would be beneficial to limit the portion of the duration of a saccade applied to its detection. The inventors, in order to provide this, have established a machine learning (ML)/artificial intelligence (AI) based solution to predict saccades based upon the user's head motion. Accordingly, with such a ML/AI based learning model achieving a high accuracy of predicting saccades the portion of the duration of a saccade applied to its detection is reduced significantly, or potentially eliminated, together with any requirements in respect of hardware-firmware-software of the VR system for detecting saccades that is specific to saccade detection.

Within the following description the inventors leverage the phenomenon of change blindness due to visual suppression with such a ML/AI prediction model. Whilst the embodiments of the invention are described with respect to the entire frame buffer being refreshed in a single shot during a predicted saccade it would be evident that other refresh methodologies and approaches may be employed without departing from the scope of the invention.

4. Correlation of Head and Eye Directions

A human adjusts their gaze continuously by applying simultaneous alterations to their head and eye rotations. These rotations, however, are independent of each other and do not follow a particular pattern. Within an initial user study, the inventors examined the relationship between head and eye rotations under the assumption of moderate cognitive load.

3.1 Application and Procedure

The inventors, in order to perform the study, developed an immersive VR experience to examine the correlation between head and eye rotations. The application portrays an open sky environment to eliminate any directional cues. Since the focus was on establishing the relationship between head and eye rotations, the inventors ensure that numerous simultaneous rotations are triggered during the experience. The participants were asked to perform a target retrieval task in this open-world environment. Precisely, users were instructed to locate a distant enemy target and eliminate it using a semi-automatic firearm. Distant targets were then scattered around the participants in random directions to trigger frequent left-right head rotations and thus simulate a moderate cognitive load.

Additionally, the participants were strictly restricted to in situ motion as the inventors required solely rotational information from the headset. Multiple targets in random directions were shown to trigger frequent gaze shifts, i.e., head and eye rotations. The targets were programmed to respawn in another random location and direction upon elimination. Preliminary tests performed by the developers while designing the application revealed that repeated head rotations could lead to nausea and severe dizziness. Due to this potential simulator sickness-inducing factor, the test was completed in steps; the participant would perform the target retrieval task for a one-minute interval, followed by a one-minute interval for rest. The steps were repeated five times such that each participant performed the task for at least five minutes in total. In addition, a score was kept making matters exciting amongst the participants encouraging them to hit more targets in a given time frame.

The primary HMD employed was the Vive™ Pro Eye with an integrated Tobii™ Eye Tracker and the environment was developed using the Unity™ 3D Game Engine. The inbuilt eye tracker of the HMD assumes the VR viewport is a 1×1 plane and returns the position (x,y) representing the gaze direction. So, for example, if the user's eyes are focused at the bottom-right of the VR viewport, the gaze output from the eye tracker is (1, 0), and if they are focused at the top-left, the output is (0, 1). The inventors recorded the gaze data at each frame and generated every participants' heatmap for the entire duration of the task. Finally, the average gaze position in the viewport was calculated by detecting the bounding boxes in the heatmaps.

3.2 Participants and Pre-Test Questionnaire

The initial pilot study aimed to determine the average gaze position in the VR viewport amongst participants during an immersive experience. This gaze was measured while the participants performed a task of target retrieval under moderate cognitive load. The study involved 12 participants, and the average age was 24.54 years, with a standard deviation of 4.38. They were asked to fill out pre-study and post-study questionnaires that gathered information about their demographics and evaluated the simulator sickness using Kennedy's simulator sickness questionnaire. Each participant reported a normal or corrected-to-normal vision. The reported median on the pre-test form for their experience using a VR device was four, and their experience using an eye-tracking device was three. This data was gathered using a 5-point Likert scale, with one being least familiar and five being most. Each participant performed the assigned task in a standing position with movements restricted to only in situ rotation.

3.3 Analysis—Average Foveal Region

Figure 6A:
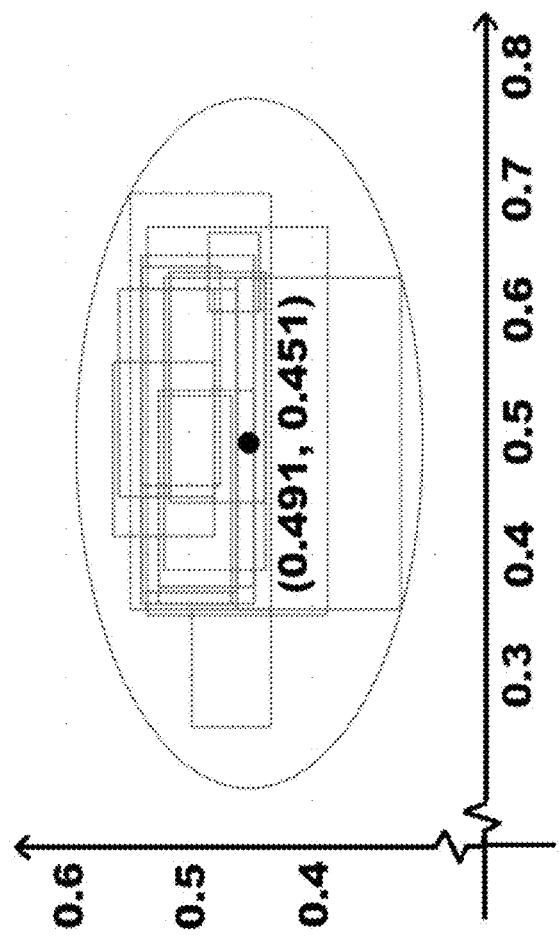
FIG. 6A depicts the bounding boxes for the participants average eye gaze positions in FIG. 5 together with the smallest enclosing ellipse.

Referring to FIG. 5 there are depicted heatmaps for the 12 participants generated from the gaze data collected during the user study for a thorough analysis of the users' distribution of fixation points. A Gaussian filter was applied to smooth the heatmaps. Each heatmap indicates the average time spent by the users fixating around any particular region of the viewport. This time increases, generally, from the outer edges towards the central region. The rectangular bounding boxes on each heatmap quantify the region of average gaze for that participant. The corner points for all bounding boxes were plotted on a single graph to find the smallest enclosing ellipse. Gartner and Schoenherr's smallest enclosing ellipse algorithm was then applied to determine the smallest ellipse that encloses all these points. FIG. 6A depicts the bounding boxes for each user together with the smallest enclosing ellipse which is given by Equation (1). The point (0.491, 0.451) being established as the ellipse's center, and the lengths of semi-major and semi-minor axes are two times 0.28 and 0.144, respectively.

$$\frac{(x-0.491)^2}{0.28^2} + \frac{(x-0.451)^2}{0.144^2} = 1 \quad (1)$$

Since the eye-trackers initially considered the viewport as a 1×1 plane, it is evident that almost all the users were mainly focused around the center of the viewport, i.e. (0.5, 0.5), for most of their VR experience despite having a highly rigorous task at hand; which is typically the case in any VR application. On examining the ellipse, one can deduce that the average foveal region of all users is in the center of the image.

TABLE 1

An overview of the SSQ responses.

| Scores | Mean | Median | Standard Deviation | Min | Max |
| --- | --- | --- | --- | --- | --- |
| Nausea (N) | 7.95 | 0 | 16.19 | 0 | 57.24 |
| Oculomotor (O) | 9.475 | 7.58 | 11.71 | 0 | 37.90 |
| Disorientation (D) | 16.24 | 0 | 26.43 | 0 | 83.52 |
| Total Score (TS) | 12.16 | 5.61 | 18.19 | 0 | 63.58 |

3.4 Simulator Sickness Questionnaire.

All participants were asked to fill out a post-test questionnaire upon completing the experiments. This questionnaire consisted of Kennedy Lane's Simulator Sickness Questionnaire (SSQ). As characterized in Kennedy et al. "Simulator sickness questionnaire: An enhanced method for quantifying simulator sickness" (International Journal of Aviation Psychology, 3:203-220, 1993), the Total Severity (TS) of the simulator sickness and its sub-categories such as Disorientation, Nausea, and Oculomotor were calculated. Based on this categorization and with zero dropouts, 83:34% of the participants reported no significant to mild symptoms, while the rest showed moderate symptoms of simulator sickness. Furthermore, with the repeated head rotations leading to vestibular disturbances, the highest average score of 16:24 for disorientation was observed as expected. An overview of the SSQ responses for this study is shown in Table 1 where the formulas of Kennedy were used to calculate the Total Severity (TS) and its corresponding subscales such as Nausea (N), Oculomotor (O), and Disorientation (D).

4 Technical Overview

The results of the inventor's first user study showed that, during an immersive VR experience, the users' gaze is fixated primarily around the center of the viewport. Based on this observation, the inventors hypothesized that when the users rotate their heads in VR, they also rotate their eyes with it, i.e., simultaneously performing a saccade-like action. This hypothesis has recently been tested by Hu et al. in "Fixationnet: Forecasting eye fixations in task-oriented virtual environments" (IEEE Trans. on Visualization and Computer Graphics, 27(5):2681-2690, 2021). Spearman's rank correlation coefficient was used to estimate the monotonic relationship between users' horizontal and vertical head rotation velocities and their fixation positions. Hu reported a clear correlation between head rotation velocities and fixation positions, confirmed by our experiments. In addition, the horizontal correlation is highest when the head is moving and decreases with time when the head stops. The inventors exploit this relationship and the visual masks (change blindness) triggered due to this presumably saccadic action to hide the rotating VE and redirect the users in VR.

Accordingly, the inventors established and trained a deep neural network, referred to as SaccadeNet, to predict saccades based solely on the tracked head rotation. Accordingly, in a manner similar to high-end eye-trackers, SaccadeNet performs in real-time, whilst eliminating the requirement for expensive external eye trackers. Based upon the predicted saccades, the inventors adjust the VE according to where the user must be redirected. Finally, results are presented below from their final user study illustrating that a majority of the users failed to notice any significant visual interference in the VR scene when they were preoccupied with a cognitive task.

5. Model Architecture, Data Acquisition and Machine Learning

Within this portion of the specification the architecture, data acquisition and machine learning aspects of the deep neural network (SaccadeNet) as established by the inventors are described. SaccadeNet predicts saccades based on tracked head rotations of a user in real-time. The inventors investigated the application of both Long Short-Term Memory network (LS™) and One Dimensional Convolutional Neural Network (1D-CNN) architectures to SaccadeNet.

5.1 Model Architecture

The inventors performed extensive tests using the same dataset on candidate architectures based on both LS™ and CNN to identify the one best-suited for the target purpose. Whilst both types of architectures performed equivalently in respect of performance when compared to LS™ only the CNN-based architecture achieved real-time performance. However, it would be evident to one of skill in the art that other artificial intelligence systems and machine learning algorithms may be employed to achieve the desired result without departing from the scope of the invention, namely prediction of saccades based upon user head rotations.

SaccadeNet was developed by the inventors using the Pytorch framework. An embodiment of SaccadeNet as used to obtain the results described below comprised four one-dimensional (1D) convolutional layers, a layer to flatten features, and four fully connected layers. Each convolutional layer was specified with a kernel size of 3, padding of 1, and stride of 1. Due to these specifications, the width remains constant (10) throughout the layers. These layers employed a Leaky Rectified Linear Unit (Leaky ReLU) activation function in the forward pass to circumvent potential vanishing gradients problems. Since the data is a time series, the input window size of nine was chosen with consecutive samples selected from the dataset. Therefore, the first layer consisted of nine input channels and 16 output channels. It was followed by (16, 32), (32,64), and (64, 128) input and output channels for the second, third, and fourth layers, respectively. The output from the final layer was flattened to produce a 128×10 input for the first fully connected layer with 1024 output channels, followed by (1024, 512), (512, 256), (256, 128), and (128, 1), input and output channels for the second, third, fourth and fifth fully connected layers, respectively. The first, second, and third fully connected layers also employed leaky ReLU activations in their forward pass, while the fourth fully connected layer employed ReLU activation to produce entirely positive values for binary classification in the final layer, and the final classification layer employed a Sigmoid activation to obtain probabilities between 0 and 1. An Adam optimizer was used with a binary cross-entropy (BCE) loss function and 0.001 learning rate for backpropagation. Finally, the model was trained over ten epochs with a batch size of 128.

it would be evident to one of skill in the art that other architectures, including but not limited to other one-dimensional or multi-dimensional architectures, activation functions, optimizers, interconnections etc. may be employed within artificial intelligence systems and machine learning algorithms without departing from the scope of the invention, namely prediction of saccades based upon user head rotations.

5.2 Data Acquisition

The inventors developed an application similar to the one used in the first study to collect the data for training SaccadeNet. This depicted a serene urban environment with the same target retrieval and elimination task to induce head rotations and simultaneous saccades. The tests were divided into three timed trials to reduce the potential of simulator sickness induced due to repeated head rotations. These trials were timed for five, ten, and fifteen minutes, respectively. A short break followed each trial as per the participants' needs.

A total of 14 participants were recruited for data collection with an average age of 25.86 years and a standard deviation of 4.37. To avoid redundancy in data, each participant recruited for this phase differed from those who participated in the first study. Among this group, 8 participants reported having normal vision, while 6 reported corrected-to-normal vision with either spectacles or contact lenses. In addition, the reported median for their experience using a VR device was four, and their experience using an eye-tracking device was three. This data was gathered using a 5-point Likert scale, with one being least familiar and five being most.

After a detailed introduction to the experiment and its procedure, each participant gave their written consent of participation and data acquisition. In order to accurately map the data gaze and head rotations, the inventors calibrated and verified the eye-trackers for every participant at the start of the experiment. This calibration was performed with participants following a dot appearing at known locations in the viewport with gaze while restricting any head movement. At the end of the experiment, each participant was asked to fill out Kennedy's sickness simulator questionnaire to quantify their comfort level during this immersive experience.

Data acquisition was performed on a workstation with an Intel™ Core™ I9-9900K CPU running at 3.60 GHz and an NVIDIA™ RTX 2080 Ti GPU. An HTC™ Vive™ Pro Eye was used as the primary VR headset to display the virtual environments. The Tobii™ Eye Tracker integrated into this headset was utilized to collect the eye-tracking data, while the head rotations were simultaneously recorded using the HTC™ Vive™ integral Lighthouse tracking system at an average frame rate of 60-90 Hz.

TABLE 2

An overview of the SSQ responses

| Scores | Mean | Median | Standard Deviation | Min | Max |
| --- | --- | --- | --- | --- | --- |
| Nausea (N) | 5.45 | 9 | 7.21 | 0 | 9/08 |
| Oculomotor (O) | 10.83 | 3.79 | 17.77 | 0 | 60.64 |
| Disorientation (D) | 14.91 | 6.96 | 17.66 | 0 | 41.76 |
| Total Score (TS) | 11.49 | 7.48 | 14.99 | 0 | 48.62 |

5.3 Simulator Sickness Questionnaire (SSQ)

On analyzing the SSQ responses, most participants (71: 43%) reported no significant signs or mild symptoms of simulator sickness, while the rest showed some moderate symptoms of simulator sickness. In addition, a mean score of 14.91 was observed on the Disorientation subscale, higher than any other subscale (Nausea and Oculomotor), which could be attributed to the repeated head rotations required by the task during the experiments. Table 2 shows the results of the SSQ responses after the data acquisition phase.

5.4 Learning & Inference 5.4A: Input Features. The inventors trained SaccadeNet with time series data comprised of historical gaze and head rotation data from the last three frames. Specifically, the inventors established the head's fixation direction, the angular velocity, and the acceleration between these successive frames as the most pertinent information for predicting future head rotations. Assuming that $f_2$; $f_1$ and $f_0$ denote the three last frames, then we define the following features:

$h_2$: y component from the head rotation at $f_2$;
$h_1$: y component from the head rotation at $f_1$;
$h_0$: y component from the head rotation at $f_0$;
$\Delta D_y$: Change in direction from $f_1$ to $f_0$;
$V_2$: Angular Velocity from $f_2$ to $f_1$;
$V_1$: Angular Velocity from $f_1$ to $f_0$;
$\Delta V$: Change in Angular Velocity from $V_2$ to $V_1$
$A_2$: Angular Acceleration from $f_2$ to $f_1$;
$A_1$: Angular Acceleration from $f_1$ to $f_0$; and
$\Delta A$: Change in Angular Acceleration from $A_2$ to $A_1$.

Within the embodiments of the invention the inventors have addressed horizontal head rotations for predicting saccades. However, it would be evident that one or more aspects of non-horizontal head rotation may be factored into other embodiments of the invention and the AI/ML systems established to predict saccades. The horizontal head rotations were measured on the y/UP-axis and were normalized before training.

These ten features, along with the ground-truth saccade recorded by the eye-trackers, completed a data point saved at each frame. During the experiments performed by the inventors, 1,900,667 (one million nine thousand six hundred and sixty-seven) data points were saved in total during our experiments with the 14 human subjects. Similar to Sun, the inventors classified a saccade as a ballistic eye movement with an angular velocity of more than 180°/s. Therefore, the ground truth was set to 1 for every saccadic and 0 for every non-saccadic frame. Furthermore, as the training was directed to a saccade during an apparent head rotation, any saccade with a head rotation of a speed less than 150°/s was disregarded. Finally, using a window size of nine, SaccadeNet was trained for binary classification of a saccadic event with the optimization details explained in Section 5.1.

It would be evident that other classifications and/or training sets may be employed to train AI/ML systems established to predict saccades within other embodiments of the invention.

5.4B: Training, Validation, and Testing. The dataset was divided into three subsets, i.e., training, validation, and test set, with an 80:10:10 split ratio, respectively. After each epoch, the model was evaluated with the validation set, while the final predictive performance was evaluated using a test set. The average precision on the validation test is 89:91% and the mean accuracy 93:41%. The precision on the test set is 88:72% and the accuracy 93:51%.

Figure 6B:
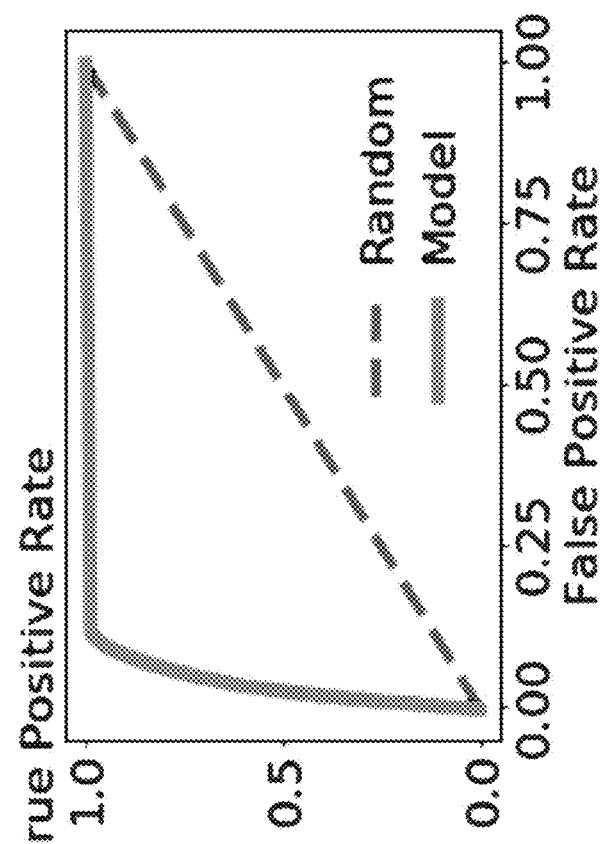
FIG. 6B depicts a receiver operating characteristic plot for real-time saccade prediction system according to an embodiment of the invention plotting the true positive rate versus false positive rate.
Figure 7:
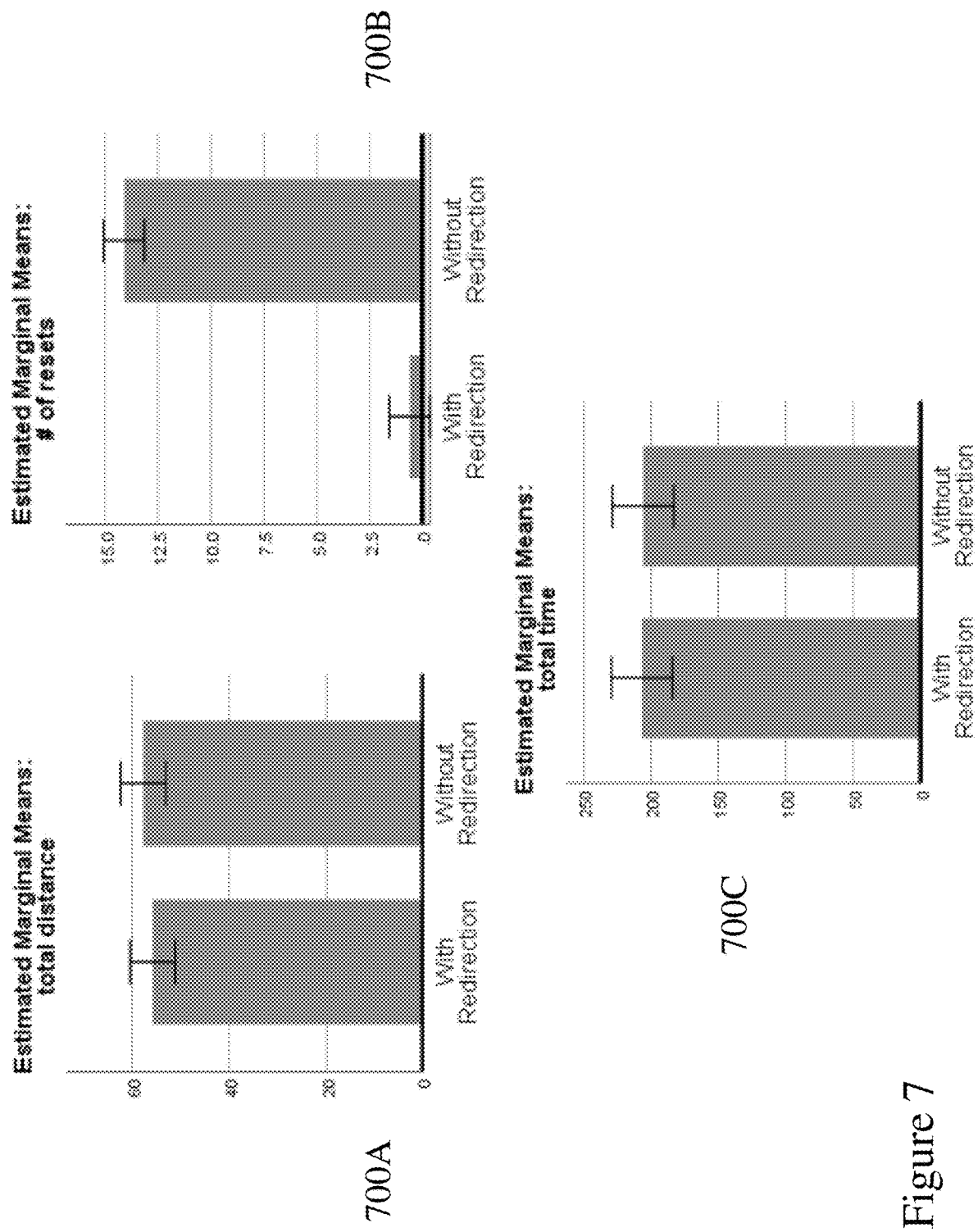
FIG. 7 depicts marginal means established by one-wave analysis of variables for a real-time saccade prediction system according to an embodiment of the invention for distance travelled, number of resets and total time taken.

Furthermore, the model was validated using the Area Under the Curve of the Receiver Operating Characteristics curve (AUC ROC). FIG. 6B depicts the ROC graph plotted for various thresholds against True Positive Rate (TPR) and False Positive Rate (FPR). The dotted line indicates the worst-case scenario, i.e., completely random predictions (AUC=0.5), and the orange curve shows the ROC. AUC for the ROC curve was higher than the worst-case and closer to 1, i.e., 0.966.

6. User Study

For the final experiment to test SaccadeNet, the inventors designed an immersive VR application to evaluate the event-based redirected walking system as a whole. Whenever SaccadeNet predicted a saccade, VE was adjusted and the natural phenomenon of change blindness exploited to hide the redirection, thus ensuring a smooth and distraction-free immersive experience.

6.1 Application and Procedure

Within this section the inventors summarize the design, development, and interactions of the application employed to evaluate our proposed redirected walking technique.

According to a study published by Simons et al. in "Change blindness: past, present, and future" (Trends in Cognitive Science, 9(1): 16-20, 2005. doi: 10.1016/j.tics.2004.11.006) change blindness is the inability of observers to notice massive changes in plain sight, which can be attributed to a lack of attention. This phenomenon is commonplace in VR applications where the users are typically engaged in cognitive tasks such as training simulations and games. Therefore, the inventors designed a first-person treasure hunt game on a mysterious island occupied by dragons and swamp crawlers to examine their redirected walking system exploiting an AI/ML based automatic saccade detection system (SaccadeNet).

6.1A: Application & Task. The main objective within the prototype immersive game established by the inventors was for the user to collect three crystals from the ruins of an ancient, abandoned arena. To achieve this, the participants had to walk from their initial spawn position to several predefined locations in the virtual environment marked by glowing crystals. Participants were given a quick tutorial at the beginning of the experience on the various interactions with the magical staff attached to their hand-held controller. Using a staff provided to their avatar, the participant could cast several magical spells such as a lightning bolt or a magic missile and make power strikes with melee attacks. Upon completing the tutorial, the first crystal and the location of the second crystal were revealed. Each of these crystals unlocked a new magical power where the power for throwing lightning bolts from the staff was unlocked with the first crystal.

Figure 4A:
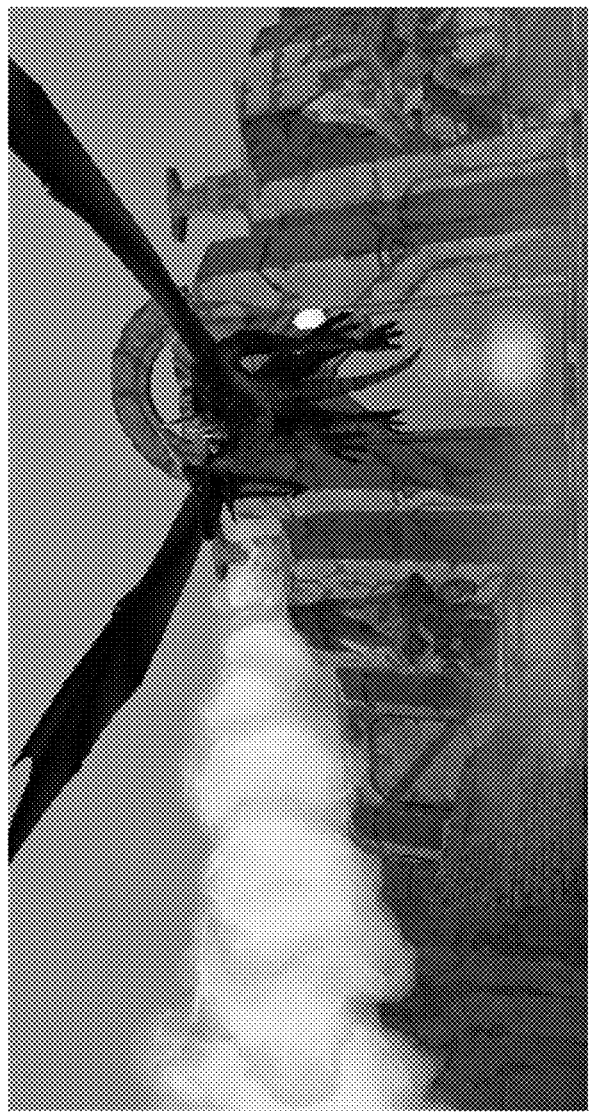
FIG. 4A depicts a screen capture from a custom-designed exploration application within which a participant walks 83.64 meters on a straight virtual path whilst within a 3:5×3:5 m2 physical environment via re-directed walking applied during saccades predicted by a system or method according to an embodiment of the invention.
Figure 4B:
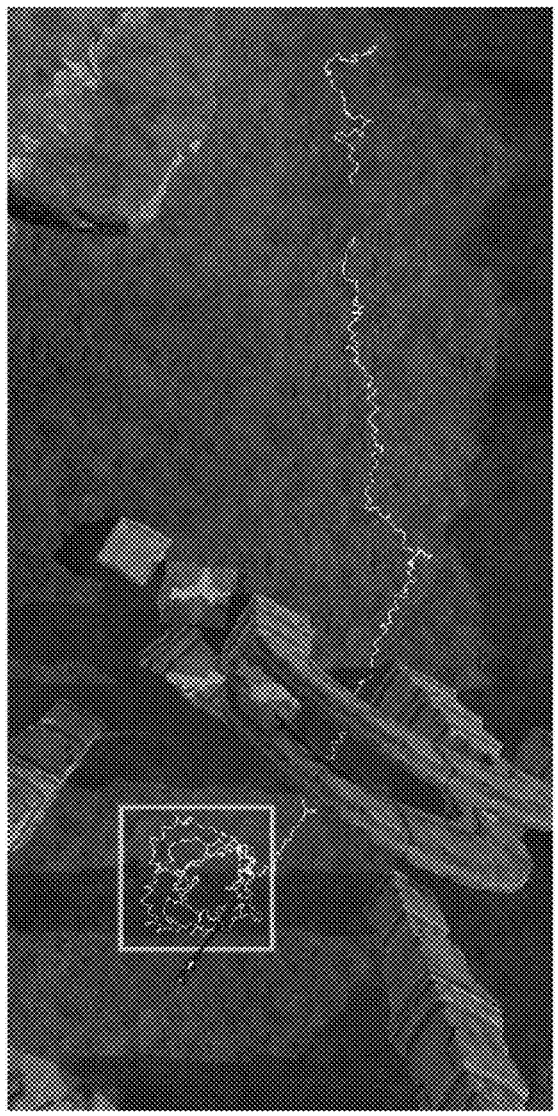
FIG. 4B depicts the user's virtual path wherein a deep learning powered redirected walking technique according to an embodiment of the invention masks fast rotations applied to the virtual environment by applying them during rapid eye movements predicted by a system or method according to an embodiment of the invention.

When walking towards the second destination, tiny dragons spawned far away flew to a random position in a predefined orbital pattern around the character. These also made sound effects whilst flying as an additional audio cue. FIG. 4A depicts an exemplary screen capture of a participant's perspective during the experiments. Participants were directed to zap these dragons using their newly gained lightning bolt power triggered by a button on the HTC™ Vive™ controller.

The immersive VR experience was designed to evaluate the redirected walking system. It involved a moderate cognitive task that caused repeated head rotations to eliminate the dragons, which meant a higher probability of saccades occurring, therefore more redirections. Furthermore, the shortest straight distance to the second destination in the VE, established at 38 m, was multiple magnitudes larger than the longest possible straight distance in the PTS. The box rendered within FIG. 4B indicates the physical tracked space whilst the lines indicate the physical (restrained within the PTS) and virtual path (within the VE) taken by the user during the final experiment, respectively.

6.1B: Redirection Algorithm. Within the exemplary embodiment of the invention built and tested by the inventors a steer-to-center algorithm was implemented for redirection. The inventors implemented a 2:1 turn reset mechanism for safety concerns that prevented any potential collision with the walls. The participants were forced to stop walking just before a potential collision and instructed to perform an in situ rotation of 180° whilst the entire VE mirrored this rotation but in the opposite direction.

6.1C: Procedure. The study performed by the inventors conducted two different experiments, with the proposed redirected walking technique being the independent variable tested. The first experiment involved participants going through the earlier mentioned course of events with a controlled condition, i.e., with only the reset mechanism enabled. The second experiment repeated the same course of actions with an experimental condition, i.e., namely both the redirection and reset mechanisms were enabled. At the end of each experiment, relevant information variables such as the number of resets, total distance travelled, and total time taken was gathered for later analysis. Additionally, both the experiments were separated by a short break.

The virtual scenes within the VE were developed using the Unity 3D Game Engine and utilized Unity's 3D Game Kit assets. The experiments were again conducted on a workstation with Intel™ Core™ 19-9900K CPU operating at 3.60 GHz and an NVIDIA™ RTX 2080 Ti GPU. The HTC™ Vive™ Pro Eye with integral Tobii™ Eye Tracker was used as the VR headset for these experiments.

6.2 Participants

The inventors recruited 32 participants (25% female) with a mean age of 27.38 years and a standard deviation of 3.74. A pre and post-study questionnaire collected the demographics and quantified the simulator sickness levels among participants using Kennedy's SSQ. All participants reported normal or corrected-to-normal vision. The reported medians for their experiences using any VR headset and an eye-tracking device were three and two, respectively. A 5-point Likert scale was utilized to gather this information, with one being the least and five being the most familiar. Additionally, before the experiment started, participants were informed about the reset mechanism and their objectives in the game. They were also instructed to walk at a normal pace and be engaged with the task. Moreover, subjective feedback collected at the end of each experimental condition task asked an open-ended question "Did you notice any visual disparity or shift in the virtual environment?".

6.3 Analysis

A detailed analysis of the results obtained from the final study is presented below. In the first part, the inventors present the quantitative results of evaluating the prediction model SaccadeNet. In the latter part, the inventors show quantitative results of the performance of the proposed redirected walking technique in its entirety.

6.3.1 SaccadeNet—Quantitative Performance Evaluation. SaccadeNet performed well within real-time limits with an average accuracy of 94:75%, recall of 99:99%, and sensitivity of 94:68%. The model's F1-score for real-time data was 0.72. Further analysis of the results showed that the training dataset was highly imbalanced towards the negative training examples, i.e., no saccades, which leads to a higher number of false positives since the true positives are orders of magnitude less. This can explain the 56:52% precision obtained from the final study. It would be evident to one of skill in the art that adjustments within the training data set, AI/ML architecture, etc. would be possible to increase the precision of SaccadeNet.

Furthermore, a saccade typically spans over several frames. Thus, although the model can predict a saccade correctly, it often mis-predicted its duration by a few frames before and after the actual saccade, which causes more false positives. Again, it would be evident to one of skill in the art that adjustments within the training data set, AI/ML architecture, etc. would be possible to increase the precision of SaccadeNet in respect of not only predicting the saccade but the exact timing of the saccade.

Importantly, the inventors note that this early prediction raises the question as to at which point in time should the redirection be applied. Should the redirection be at the first positive prediction or after a number, X, of consecutive positive predictions, and if the latter, what is the best X. The inventors performed four fine-tuning experiments involving a total of 12 participants (2+3+3+4) to address this question.

6.3.2: Fine-Tuning. In the first experiment, the inventors applied redirection at the first positive prediction. Since the VE was rotated just before the actual saccade began, the two participants (2/2) reported that they noticed the redirection. In the second and third experiments, the VE was rotated only if two and three consecutive frames made positive predictions, respectively. All participants (3/3) in the second and two (2/3) in the third experiment reported noticing the angular shift, while the other participant (1/3) in the third experiment reported a distraction-free experience. In the fourth experiment, redirection was only applied if positive predictions were made over four consecutive frames. All participants (4/4) reported a distraction-free experience and were not able to perceive any angular shift.

Given the outcomes of these experiments, the inventors subsequently used a window size of four consecutive positive predictions before applying the redirection in the user study conducted to evaluate the redirected walking technique described below.

6.3.3 Performance Evaluation of the Proposed Redirected Walking Technique.

The inventors performed a statistical analysis to evaluate the proposed RDW technique. Results from the Levene's test, see "Robust tests for equality of variances" (Contributions to Probability and Statistics, pp. 278-292, 1960), showed that the outcomes for distance travelled (F(0:045)= 0:366; p>0:05) and total time taken (F(0:006)=0:003; p>0:05) were normally distributed. They did not violate the homogeneity of variances assumption. Therefore, equal variances were assumed for these variables. However, the number of resets (F(59:798)=396:094; p<0:05) variable, on the other hand, violated the homogeneity assumption and showed enough variance to account for any potential mean difference in its samples. Thus, it further indicated the need for non-parametric analysis of variances to determine the significance level of the mean differences in these variables.

A one-way analysis of variance (ANOVA) was performed between groups, with repeated measures and α=0:05. The analysis statistically differentiated the impacts of using and not using redirection on our dependent variables, such as the number of resets, total distance travelled, and total time taken. The effect sizes for all the variables were determined using partial eta squared $(n_p^2)$ values from the analysis. Partial eta squared values reported that our independent variable, i.e., toggling redirection, accounted for almost 86:5% of the observed variance in the number of resets. In comparison, it only contributed about 0:6% and 0:0% to the variances observed in total distance travelled and total time taken, respectively. The analysis also reported a statistically significant difference between the number of resets (F(1; 62)=396:094; p<0:001), with and without using our proposed redirection technique. However, a statistically insignificant effect of toggling redirection was observed on the total distance travelled (F(1;62)=0:366; p>0:05) and time taken (F(1;62)=0:003; p>0:05). Means for dependent variables with respect to the independent are plotted in FIG. 4 with error bars at a confidence interval of 95%.

Furthermore, the inventors observed that the proposed system applied an average absolute gain of 12:89° per redirection to the VE, at about 0.55 redirections per second. Thus, 1375:0994° of average absolute gain was introduced to each participant's FoV in total during the entire study with a standard deviation of 432:131°. Moreover, each participant covered a straight distance of at least 38 meters in the VE whilst walking within the 3:5×3:5 m² PTS. FIG. 5B (right) shows the path of a participant during the final study together with a representation of the PTS limits for reference. Furthermore, since the lower precision was compensated by only redirecting on four consecutive positive predictions, none of the participants noticed any disparity or distraction in the VE due to repeated redirection.

Furthermore, most of our participants (71:87%) reported no significant signs of simulator sickness, while the rest showed some mild symptoms. The mean score for disorientation peaked among the other subscales, similar to our previous studies. However, due to the inventors' continuous efforts of reducing this score, it is evident that this dropped from the first study in Section 3.3 (16.24) to the Data Collection in Section 5.2 (14.91), and finally, this final user study (13.05). Table 3 shows an overview of the SSQ responses for this final user study. Overall, every participant had a smooth experience, with one stating, "I felt like walking straight inside the game but I was actually walking in circles to my surprise. It is a really good experience and I didn't notice any distractions." at the end of the experiment.

TABLE 3

An overview of the SSQ responses.

| Scores | Mean | Median | Standard Deviation | Min | Max |
| --- | --- | --- | --- | --- | --- |
| Nausea (N) | 10.14 | | | 0 | 38.16 |
| Oculomotor (O) | 9.95 | | | 0 | 60.64 |
| Disorientation (D) | 13.05 | | | 0 | 55.68 |
| Total Score (TS) | 12.39 | 9.35 | 14.55 | 0 | 56.1 |

7. Comments

The efficacy of the innovative proposed redirected walking technique was examined in the final user study where the results indicate its robust performance. The technique is especially effective when the users are preoccupied with a moderate to high cognitive workload. The effect of change blindness, induced due to saccades, is further strengthened by this attention deficit. Therefore, the scope of the inventor's proposed technique can be applied to a wide range of VE/VR applications including, but not limited to, training simulations and games.

The inventor's final user study showed that users were able to explore long straight virtual distances of at least 38 meters by naturally walking within a room-scale physical tracked space of 3:5×3:5 m². One participant was able to walk 83.64 meters without any resets. Further, fine-tuning of the hyper-parameters resulted in the application of redirection if four consecutive positive predictions were made, all 20 participants during the evaluation completed the task without any distraction, and none of them noticed the angular shift despite the model's 56.52% precision.

Upon asking, "Did you notice any visual disparity or shift in the virtual environment during the entire experience?" in a post-test questionnaire, one participant stated, "I did not notice any visual disparity or shift. The experience was smooth."

Furthermore, the inventor's innovative technique does not require any additional hardware for the HMD to work, i.e., eye-trackers forming part of or in addition to the HMD or additional tracking/motion detection systems such as Microsoft™ Kinect™. This is particularly beneficial as the current options for VR headsets with integrated eye-trackers are limited and more expensive than regular HMD headset. This limits their use for mostly research or industrial purposes. Therefore, eliminating the need for eye-trackers gives the innovative technique many advantages such as computing requirements, accessibility, and hardware cost, and sets the approach to redirection apart from the other state-of-the-art works.

Further, the applicability of the technique can be to any VR, HMD or augmented reality vision system including systems such as those represented by Google™ Glass™ or Google™ Glass™ Enterprise Edition 2 for example.

Further, the AI/ML architecture can be adjusted to account for one or more factors of the HMD such as, for example, processor speed, processor memory, and HMD memory. The processor may be one associated with the HMD directly, e.g., integrated within the HMD, or it may be one associated with the HMD indirectly through an electrical or wireless link for example In this manner implementations of Moreover, optimizing the model allows for the AI/ML processes according to embodiments of the invention to be executed upon processors of consumer electronic devices such as smartphones etc. allowing saccadic redirection to be implemented or supported on both low cost and/or readily available mobile VR systems.

Accordingly, as described above the inventors have established an innovative event-based redirection technique powered by an AI/ML model SaccadeNet, such as a CNN-based model, to predict the change blindness induced due to saccades during head rotations. The innovative technique exploits these predicted visual suppressions and repeatedly applies subtle rotations to the VE in dependence of determining the saccade once a trigger condition using the output(s) of the SaccadeNet is met. These rotations, generally subtle, are enough to adjust a user's physical walking direction while perceiving a straight motion in VR.

The innovative techniques allow for VRs to exploit change blindness induced due to saccades during head rotations without requiring the HMD to have eye-tracking integrated or associated with the HMD such that saccadic redirected walking can be implemented on a wide variety of HMDs providing augmented vision as well as immersive VR.

Within the embodiments of the invention described and depicted above the ML/AI is trained to predict saccades during head rotations within a VR environment providing the user with tasks and dynamic visual content. However, it would be evident that the same methodologies can be applied to predicting saccades under what might be referred to as "normal" viewing conditions wherein the user's visual loading is reduced and their head rotations less frequent or lower in range.

Further, it would be evident that the same methodologies can be applied to predicting saccades under different visual loading and visual environments, e.g., presenting information within an augmented vision situation of "everyday" life versus an immersive gaming scenario or a training/analysis/repair situation so that the ML/AI employed and/or elements of the ML/AI such as the classifier for example are selected dynamically, periodically or aperiodically selected to predict saccades under different visual loadings, application environments, etc.

Further, it would be evident that the same methodologies can be applied to predicting saccades under different stimuli in addition to visual stimuli. For example, varying sounds presented to the user or haptic inputs/outputs to/from the user may similarly trigger head rotations allowing redirection to be applied. Alternatively, the ML/AI employed and/or elements of the ML/AI such as the classifier for example are selected dynamically, periodically or aperiodically selected to predict saccades under different haptic conditions, external stimuli etc.

Accordingly, an ML/AI according to an embodiment of the invention may be employed to predict saccades whilst the user is presented various audio-visual stimulations such as explosions, flashing lights, or spatial sounds embedded directly into a scene without introducing a visual distraction or changing the 3D content.

Further, it would be evident that the methodologies described above with respect to embodiments of the invention predict saccades based only on head rotations, head rotation velocities and pre-defined velocity thresholds. However, it would be evident that the ML/AI may be trained to the user so that the head rotation velocities and velocity thresholds, for example, as established through the training phase such that users with restricted motion ranges, speed of motion, etc. can exploit the saccade redirected motion as users may be within wheelchairs or have assisted motion systems helping them move within the PTS. Further, the saccade redirection may control motion of an assisted motion system, e.g., a motorized wheelchair, or other mobile element within the PTS.

Further, it would be evident that the methodologies described above with respect to embodiments of the invention may be extended beyond that employed within the studies so that, for example, saliency maps and/or depth maps may be established from the virtual content in order to enhance the training of the gaze forecasting model(s) employed by the ML/AI systems. Furthermore, correlations between a user's torso and their gaze may also be included wherein the user's torso motion may be obtained from one or more accelerometers associated with the user, such as within their smartphone in their pocket for example, or external analysis systems, e.g., video acquisition/processing either of a discrete system or systems within the PTS or acquired from cameras associated with HMDs of other users within the PTS.

Accordingly, ML/AI systems according to embodiments of the invention may be trained to employ one or more of tracked motion of user's hand(s), foot or feet, torso, etc. in addition to the head rotation.

Further, whilst the embodiments of the invention described and depicted relate to user head rotations to support saccadic redirection methods it would be evident that redirection within a PTS may also include translational motions in order to provide for either lack of interaction/reaching of an edge of the PTS or to move around an object within the PTS. Accordingly, embodiments of the invention may support saccadic redirections that are translations, e.g., left, right, forward, backward as well overall directional adjustments. Accordingly, saccadic redirections systems may support only rotational gains for redirection or they may support solely translational gains or combinations of rotational gains and translation gains whilst maintaining the real-time performance.

Within embodiments of the invention the ML/AI is trained to identify a saccade which may be a minor saccade or a major saccade. Within other embodiments of the invention the ML/AI may be trained to predict both minor saccades and major saccades with data in the output of the ML/AI defining whether the predicted saccade is a minor saccade or a major saccade.

Within embodiments of the invention the ML/AI is trained to identify another visual event for an eye such as a blink for example. Within other embodiments of the invention the ML/AI may be trained to predict blinks, minor saccades and major saccades with data in the output of the ML/AI defining whether the predicted visual event is a blink, a minor saccade or a major saccade.

Within other embodiments of the invention redirected walking systems may employ a saccade prediction algorithm(s).

Within other embodiments of the invention redirected walking systems may employ other forms of visual suppression e.g., phase of nystagmus, etc.

Within the embodiments of the invention the embodiments of the invention have been presented from the viewpoint of allowing a user to achieve a larger VE distance of travel than that of the PTS they are within. However, it would be evident that the redirection of motion according to embodiments of the invention may also be employed to redirect motion of a user within a PTS where the user is employing an HMD wherein the images rendered to the user are now not of a VE but their physical environment. These physical environment images may be processed to address visual defect(s) and/or vision degradation(s) of the user. Accordingly, a user with visual impairments wearing an HMD may thereby have their physical motion redirected to avoid impacting elements within their physical environment. Accordingly, the HMD may through structured optical systems, lidar, sonar, radar, etc. establish a map of objects/surfaces etc. For example, such a redirected walking enhanced HMD may be used by the elderly with degraded vision to keep them mobile with reduced risk of injury/incident etc.

Within the embodiments of the invention described and depicted above the process has been described and depicted with respect to images from two cameras although it would be evident that these are "virtual" cameras, the first representing the VE field of view as viewed by the user in their foveal region and the other representing the VE field of view as viewed by the user if they had turned by a predetermined rotational angle. This second VE field of view is rendered in the peripheral vision of the user whilst a transition region is generated to "blend" between the first and second field of views so that user is not aware of the boundary between them.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g., software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of redirecting motion of a user comprising:
    establishing a machine learning model;
    training the machine learning model;
    employing the trained machine learning model to predict a predetermined natural event relating to an eye of the user; and redirecting the user's motion within a physical environment by adjusting visual content presented to the user by a head mounted display associated with the user; wherein the redirection of the user's motion is one of a rotational change in the user's motion and a translational change in the user's motion; and the redirection of the user's motion is only applied after the trained machine learning model generates a threshold number of consecutive predictions of the predetermined natural event.

2. The method according to claim 1, wherein the predetermined natural event is a saccade; and an input to the trained machine learning model is data relating to one or more aspects of rotation of a head of the user.

3. The method according to claim 1, wherein the predetermined natural event is a minor saccade, a major saccade or a blink;

an input to the trained machine learning model is data relating to one or more aspects of rotation of a head of the user; and an output of the trained machine learning model comprises first data relating whether the predetermined natural event is predicted and second data defining what predetermined natural event is predicted.

4. The method according to claim 1, wherein the user's motion redirection is implemented by a mobility system associated with the user.

5. A head mounted display (HMD) comprising:

one or more display for rendering visual content to a user of the HMD; and a microprocessor executing computer executable instructions stored within a memory accessible to the microprocessor; wherein a portion of the computer executable instructions relate to a trained machine learning model which predicts a predetermined natural event relating to an eye of the user;

an output of the trained machine learning model is employed by the microprocessor to adjust the visual content rendered to the user of the HMD;

the adjustments to the visual content rendered to the user redirect the user's motion within a physical environment;

the redirection of the user's motion is one of a rotational change in the user's motion and a translational change in the user's motion; and the redirection of the user's motion is only applied after the trained machine learning model generates a threshold number of consecutive predictions of the predetermined natural event.

6. The HMD according to claim 5, wherein the predetermined natural event is a saccade; and an input to the trained machine learning model was data relating to one or more aspects of rotation of a head of the user.

7. The HMD according to claim 5, wherein the predetermined natural event is a minor saccade, a major saccade or a blink;

an input to the trained machine learning model was data relating to one or more aspects of rotation of a head of the user; and the output of the trained machine learning model comprises first data relating whether the predetermined natural event is predicted and second data defining what predetermined natural event is predicted.

8. The HMD according to claim 5, wherein the user's motion redirection is implemented by a mobility system associated with the user.

* * * * *